US009363003B2

(12) United States Patent
Ishihara et al.

(10) Patent No.: US 9,363,003 B2
(45) Date of Patent: Jun. 7, 2016

(54) TRANSMITTER AND WIRELESS COMMUNICATION METHOD

(71) Applicant: NIPPON TELEGRAPH AND TELEPHONE CORPORATION, Tokyo (JP)

(72) Inventors: Koichi Ishihara, Yokosuka (JP); Yasushi Takatori, Yokosuka (JP); Masato Mizoguchi, Yokosuka (JP); Yusuke Asai, Yokosuka (JP); Tomoki Murakami, Yokosuka (JP)

(73) Assignee: Nipon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/430,886

(22) PCT Filed: Nov. 5, 2013

(86) PCT No.: PCT/JP2013/079866
§ 371 (c)(1),
(2) Date: Mar. 24, 2015

(87) PCT Pub. No.: WO2014/073522
PCT Pub. Date: May 15, 2014

(65) Prior Publication Data
US 2015/0256246 A1    Sep. 10, 2015

(30) Foreign Application Priority Data
Nov. 7, 2012   (JP) ................................ 2012-245320

(51) Int. Cl.
*H04L 1/02*    (2006.01)
*H04B 7/06*    (2006.01)
*H04B 7/04*    (2006.01)

(52) U.S. Cl.
CPC ............ *H04B 7/0626* (2013.01); *H04B 7/0452* (2013.01); *H04B 7/0456* (2013.01);
(Continued)

(58) Field of Classification Search
CPC ............. H04L 25/0202; H04B 7/0626; H04B 7/0452; H04B 7/0617
USPC ........... 375/267, 260, 346, 347; 370/204, 252
See application file for complete search history.

(56) References Cited

U.S. PATENT DOCUMENTS

2004/0240376 A1*  12/2004  Wang .................... H04L 25/022
                                                                                  370/204
2012/0087265 A1     4/2012  Tamaki et al.
(Continued)

FOREIGN PATENT DOCUMENTS

WO    WO-2010/125635 A1    11/2010
WO    WO-2011/076766 A1    6/2011
WO         2012/114413 A1    8/2012

OTHER PUBLICATIONS

M. Joham, et al., "Linear transmit processing in MIMO communications systems", IEEE Trans. Signal Processing, pp. 2700-2712, vol. 53, No. 8, Aug. 2005.

(Continued)

*Primary Examiner* — Khai Tran
(74) *Attorney, Agent, or Firm* — Harness, Dickey & Pierce, P.L.C.

(57) ABSTRACT

A transmitter that has a plurality of antenna elements and executes spatially multiplexed transmission of data to a receiver via the antenna elements, where the data is weighted utilizing a transmission weight. Channel state information, which indicates propagation characteristics between the antenna elements and an antenna element of the receiver, is obtained or estimated. When the channel state information has been updated, an updated transmission weight is computed based on the previous channel state information before the updating thereof and/or the updated channel state information, and the previous transmission weight before the updating thereof, which was computed for the previous channel state information.

11 Claims, 10 Drawing Sheets

(52) U.S. Cl.
CPC ............. *H04B 7/063* (2013.01); *H04B 7/0615* (2013.01); *H04B 7/0617* (2013.01); *H04B 7/0619* (2013.01); *H04B 7/0697* (2013.01)

(56) References Cited

U.S. PATENT DOCUMENTS

2013/0052951 A1* 2/2013 Hwang .................. H04W 72/12 455/41.1
2014/0376355 A1* 12/2014 Kudo .................. H04B 7/0456 370/203

OTHER PUBLICATIONS

IEEE, "Part 11: Wireless LAN Medium Access Control (MAC) and Physical Layer (PHY) specifications: Enhancements for Higher Throughput", IEEE802.11n-2009, Oct. 2009.

K. Ishihara, Y. Asai, R. Kudo, T. Ichikawa, and M. Mizoguchi, "Indoor experiments on real-time multiuser MIMO transmission in wireless LAN systems", in Proc. IEEE Wireless Communications and Networking (WCNC), Apr. 2012.

I. Barhumi, et al., "Optimal training design for MIMO OFDM systems in mobile wireless channels", IEEE Trans. Sig. Process., vol. 51, No. 6, Jun. 2003.

Koichi Ishihara et al., "Indoor Experiments of Real-Time Downlink Multiuser MIMO Transmission for Next Generation Wireless LANs", IEICE Technical Report, vol. 111, No. 289, The Institute of Electronics, Information and Communication Engineers, Nov. 9, 2011, pp. 179 to 184, RCS2011-219, with abstract thereof.

International Search Report for PCT/JP2013/079866, ISA/JP, mailed Dec. 10, 2013, with English translation.

Notice of Reasons for Rejection, Japanese Patent Application No. 2014-545703, Oct. 13, 2015.

\* cited by examiner

TRANSMITTER AND WIRELESS COMMUNICATION METHOD

TECHNICAL FIELD

This application is a 371 U.S. National Phase of PCT/JP2013/079866, filed on Nov. 5, 2013, which claims priority to Japanese Patent Application No. 2012-245320, filed on Nov. 7, 2012, the entire content of both applications is incorporated herein by reference.

The present invention relates to a transmitter and a wireless communication method, which perform multiuser MIMO (Multiple Input Multiple Output) transmission as high-speed wireless communication that can communicate information to a plurality of communication partners by means of spatially multiplexed independent signal sequences via a plurality of different transmission antennas utilizing a common frequency band.

BACKGROUND ART

In recent years, IEEE 802.11g and IEEE 802.11a are becoming remarkably popular as standards for high-speed wireless communication systems that utilize a 2.4 or 5 GHz band. Such wireless communication systems implement a transmission speed up to 54 Mbps by employing an OFDM (Orthogonal Frequency Division Multiplexing) method that stabilizes the characteristics of the systems in multipath fading environments.

In the future, the number of services utilizing a higher-speed wireless communication system will probably increase, and therefore, a great increase in the number of terminal devices in such a wireless communication system is expected.

However, since the frequency bands applicable to communication are finite, an increase in the number of terminal devices causes lack of frequency channels. As a result, no frequency channels may be usable by some terminal devices and the relevant users will not be able to perform communication utilizing the terminal devices.

Therefore, recently, multiuser MIMO transmission has been receiving maximum attention as a technique of increasing the transmission speed and implementing a larger-scale system. FIG. 10 is a diagram that shows the structure of a wireless communication system to which the multiuser MIMO transmission technique is applied.

In a multiuser MIMO transmission technique applied to a wireless communication system as shown in FIG. 10, different independent signals are sent at a common frequency and timing via N transmission antenna elements (N is a natural number greater than or equal to 2) of a base station apparatus 11 (as an access point (AP)) to U terminal devices (i.e., stations (STAs)) 12-1 to 12-U (U is a natural number greater than or equal to 2) as communication partners, each having M(u) antenna elements (u=1, . . . , U).

In the above process, the whole of the U reception antenna elements is regarded as a huge reception array so as to improve the downstream throughput.

The multiuser MIMO transmission technique may be a ZF (Zero forcing) method or a MMSE (Minimum mean square error) method (see Non-Patent Document 1).

In such communication techniques, a base station apparatus as a sending device acquires channel state information, which indicates propagation characteristics between antenna elements of the present apparatus and antenna elements of individual terminal devices, and computes a transmission weight based on the acquired channel state information Generally, in order that the base station apparatus 11 acquires the channel state information before sending signals to the plurality of communication partners by means of the multiuser MIMO transmission technique, each terminal device 12 estimates the channel state information (i.e., transfer function) in advance and feeds the information back to the base station apparatus 11. Based on the relevant information, the base station apparatus 11 computes the weight to perform the multiuser MIMO transmission.

If TDD (Time Division Duplex) is performed between the base station apparatus and the terminal devices 12, the base station apparatus 11 utilizes a known signal sent from each terminal device 12 to estimate the channel state information for the upstream link. The estimated information is corrected utilizing a premeasured calibration value and the corrected channel state information is utilized by the base station apparatus 11 to compute the transmission weight so as to perform the multiuser MIMO transmission (see, for example, Non-Patent Document 2).

PRIOR ART DOCUMENT

Non-Patent Document

Non-Patent Document 1: M. Johan, et al., "Linear transmit processing in MIMO communications systems", IEEE Trans. Signal Processing, pp. 2700-2712, Vol. 53, No. 8, August 2005.

Non-Patent Document 2: IEEE, "Part 11: Wireless LAN Medium Access Control (MAC) and Physical Layer (PHY) specifications: Enhancements for Higher Throughput", IEEE802.11n-2009, October 2009.

DISCLOSURE OF INVENTION

Problem to be Solved by the Invention

However, after obtaining the channel state information between the base station apparatus and the terminal devices, the technique disclosed in non-patent document 1 requires an inverse matrix operation of the channel state information so as to compute the transmission weight, which increases the circuit size of the base station apparatus as the transmission device.

In addition, if the transmission weight computation requires considerable time, the propagation characteristics varies, which may produce a difference between the propagation characteristics at the time of acquiring the channel state information and the propagation characteristics at the time of performing the transmission utilizing the transmission weight, and thus the computed transmission weight may not have an optimal value.

That is, if no high-speed operation of computing the transmission weight in response to the temporal variation in the propagation characteristics can be executed, the increase in the speed and size of the system by means of the multiuser MIMO transmission may not be implemented.

The technique disclosed in Non-Patent Document 2 also has a problem similar to that of Non-Patent Document 1.

In light of the above circumstances, an object of the present invention is to provide transmitter and a wireless communication method, which can reduce the time required to update the transmission weight based on updating information about the channel state information between the relevant devices.

Means for Solving the Problem

In order to achieve the above object, the present invention provides a transmitter that has a plurality of antenna elements and executes spatially multiplexed transmission of data to a receiver via the antenna elements, where the data is weighted utilizing a transmission weight, the transmitter comprising:

a channel state information collecting unit that obtains or estimates channel state information which indicates propagation characteristics between the antenna elements and an antenna element of the receiver; and a transmission weight updating unit, wherein when the channel state information has been updated, the transmission weight updating unit computes an updated transmission weight based on the previous channel state information before the updating thereof and/or the updated channel state information, and the previous transmission weight before the updating thereof, which was computed for the previous channel state information.

In a typical example, the transmission weight updating unit comprises:

a channel matrix updating unit, wherein based on the previous channel state information and/or the updated channel state information, and a channel matrix which was utilized to compute the previous transmission weight, the channel matrix updating unit computes an updated channel matrix; and a transmission weight computation unit that computes the updated transmission weight based on the updated channel matrix, and the previous channel state information and/or the updated channel state information.

In this case, for an inverse matrix of autocorrelation of the channel matrix utilized to compute the previous transmission weight, the channel matrix updating unit may subtract the previous channel state information from the inverse matrix and/or adds the updated channel state information to the inverse matrix to compute an updated inverse matrix, which the channel matrix updating unit utilizes to compute the updated channel matrix.

In a preferable example, the transmitter further comprises:

a transmission unit that transmits the receiver a signal which includes a data sequence utilized to estimate the propagation characteristics, wherein:

the channel state information collecting unit obtains the updated channel state information from a signal which is transmitted from the receiver only when the receiver updates the channel state information in response to the signal transmitted from the transmission unit.

In another preferable example, the channel state information collecting unit estimates the updated channel state information based on a signal which is transmitted from the receiver when the receiver updates the channel state information, where the signal includes a data sequence utilized to estimate the propagation characteristics.

In another preferable example, the transmitter further comprises:

an update propriety determination unit that determines whether or not a predetermined condition for the updating of the transmission weight is satisfied, wherein:

the transmission weight updating unit computes the updated transmission weight only when the predetermined condition is satisfied.

The present invention also provides a wireless communication method performed by a transmitter that has a plurality of antenna elements and executes spatially multiplexed transmission of data to a receiver via the antenna elements, where the data is weighted utilizing a transmission weight, the method comprising:

a channel state information collecting step that obtains or estimates channel state information which indicates propagation characteristics between the antenna elements and an antenna element of the receiver; and a transmission weight updating step, wherein when the channel state information has been updated, the transmission weight updating step computes an updated transmission weight based on the previous channel state information before the updating thereof and/or the updated channel state information, and the previous transmission weight before the updating thereof, which was computed for the previous channel state information.

In a typical example, the transmission weight updating step includes:

a channel matrix updating step, wherein based on the previous channel state information and/or the updated channel state information, and a channel matrix which was utilized to compute the previous transmission weight, the channel matrix updating step computes an updated channel matrix; and a transmission weight computation step that computes the updated transmission weight based on the updated channel matrix, and the previous channel state information and/or the updated channel state information.

Effect of the Invention

According to the present invention, the transmission weight is computed utilizing the obtained channel state information which has been updated. Therefore, even when only part of the channel state information has been updated, the transmission weight can be updated without performing the whole process of computing the transmission weight, and by which time required to compute the transmission weight can be reduced.

MODE FOR CARRYING OUT THE INVENTION

A wireless communication system, which includes a base station apparatus as an embodiment of the transmitter of the present invention, and a wireless communication method performed by the relevant base station apparatus will be explained in detail with reference to the drawings.

The wireless communication system in each embodiment explained later employs, as an example, a base station apparatus which transmits spatially multiplexed data by means of the multiuser MIMO transmission and U terminal devices (U is a natural number greater than or equal to 2) which receive the spatially multiplexed data.

In the arrangement of the embodiment, a single-user MIMO (i.e., just a MIMO) is obtained if there is only one terminal device. Additionally, the wireless communication system may have an arrangement in which a terminal device sends spatially multiplexed data and the base station apparatus receives the spatially multiplexed data. In this case, the terminal device functions as the transmitter of the present invention.

Additionally, the relevant embodiment employs a transmission weight (as disclosed in Non-Patent Document 1 or the like) generated utilizing the ZF (Zero forcing) or MMSE (Minimum mean square error) method.

First Embodiment

Figure 1:
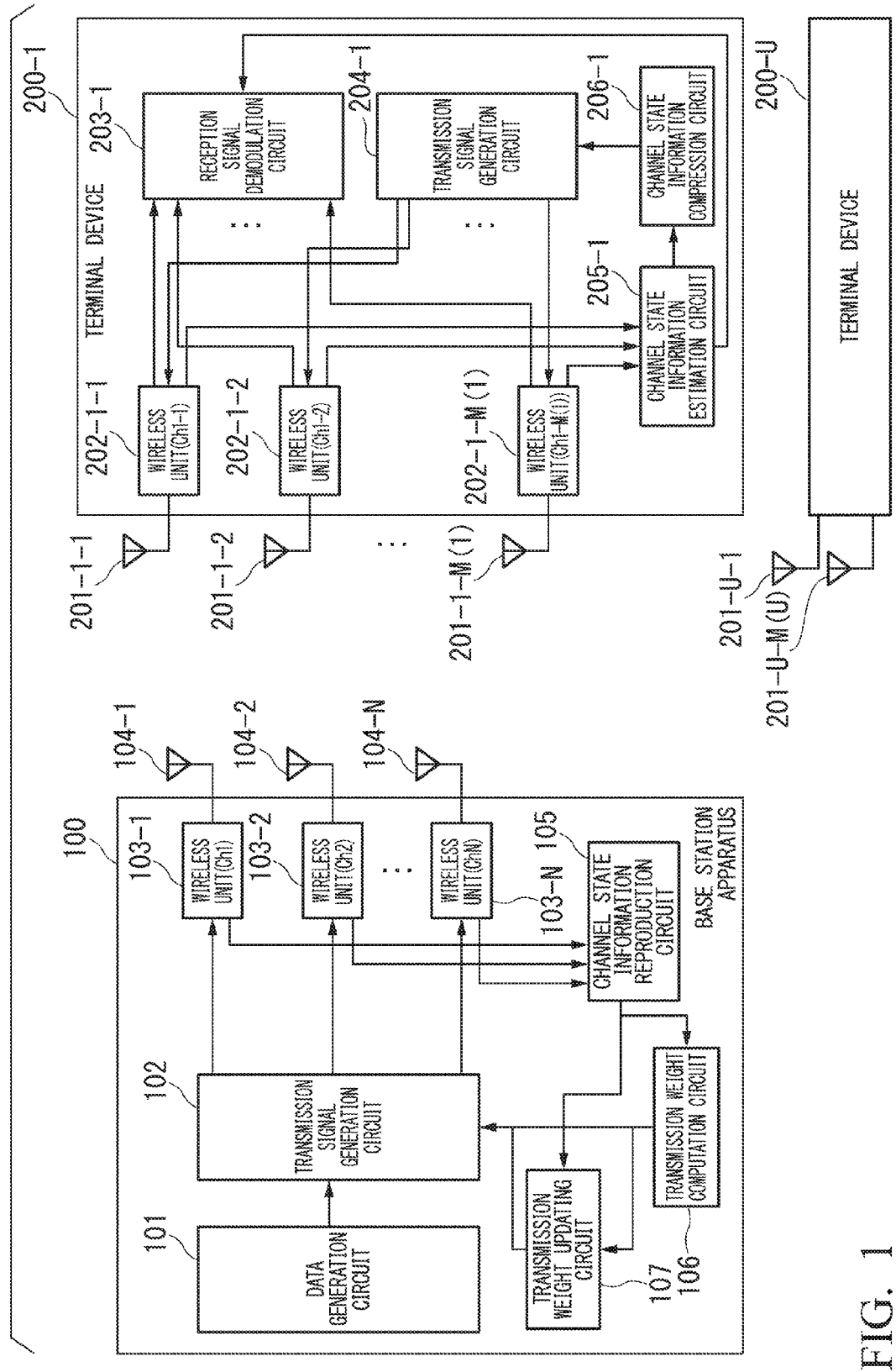
FIG. 1 is a block diagram showing the structure of a base station apparatus 100 and terminal devices 200-1 to 200-U, which are included in a wireless communication system of a first embodiment of the present invention.

FIG. 1 is a block diagram showing the structure of a base station apparatus 100 and terminal devices 200-1 to 200-U, which are included in a wireless communication system of a first embodiment.

The terminal devices 200-1 to 200-U of the wireless communication system have the same structure. Below, "terminal device 200" is utilized when indicating all terminal devices 200-1 to 200-U or any one thereof.

The base station apparatus 100 has a data generation circuit 101, a transmission signal generation circuit 102, wireless units 103-1 to 103-N (N is a natural number greater than or equal to 2), antenna elements 104-1 to 104-N, a channel state information reproduction circuit 105, a transmission weight computation circuit 106, and a transmission weight updating circuit 107.

The data generation circuit 101 generates a training signal sequence utilized to estimate propagation characteristics between the antenna elements provided at each terminal device 200 and the antenna elements 104-1 to 104-N provided at the present apparatus. The data generation circuit 101 also generates a transmission data sequence to be transmitted to each terminal device 200.

The training signal sequence generated by the data generation circuit 101 is a data sequence that includes a pattern by which all propagation characteristics between the antenna elements 104-1 to 104-N provided at the base station apparatus 100 and the antenna elements provided at each terminal device 200 and can be estimated.

The data generation circuit 101 generates such a pattern utilizing a known technique. For example, an orthogonal pattern disclosed in Non-Patent Document 2 may be utilized as the training signal sequence.

The transmission signal generation circuit 102 generates a transmission signal utilizing the training signal sequence or the transmission data sequence generated by the data generation circuit 101.

For example, when sending an OFDM signal, the transmission signal generation circuit 102 performs mapping of the training signal sequence or the transmission data sequence (which has been subjected to error correction encoding) onto individual subcarriers utilized for communication.

The transmission signal generation circuit 102 then performs symbol modulation of the training signal sequence or the transmission data sequence, which have been subjected to the mapping onto the subcarriers, where the symbol modulation is executed for each subcarrier (as a processing unit) or commonly executed for all subcarriers.

As the symbol modulation, BPSK (Binary Phase Shift Keying), QPSK (Quadrature Phase Shift Keying), or QAM (Quadrature Amplitude Modulation) may be utilized. Another modulation method may be employed as the symbol modulation.

Based on a transmission weight computed by the transmission weight computation circuit 106, the transmission signal generation circuit 102 generates a multiuser MIMO signal for the symbol-modulated signal by means of transmission beam forming.

If signal sending is executed without performing the transmission beam forming (this case includes sending a sounding (training) frame utilized to estimate a wireless propagation path), the transmission signal generation circuit 102 performs no transmission beam forming.

The transmission signal generation circuit 102 also subjects the symbol-modulated signal or a signal obtained through the transmission beam forming to OFDM modulation utilizing IFFT (Inverse Fast Fourier Transform) so as to generate a temporal sequence of the transmission signal in which a guard interval (i.e., time interval provided between OFDM symbols so as to prevent interference by delay waves) is provided.

The wireless units 103-1 to 103-N performs digital-to-analog conversion of the transmission signal generated by the transmission signal generation circuit 102 from the training signal sequence or the transmission data sequence and further performs frequency conversion of the relevant signal so as to produce a radio (or wireless) signal adapted to a frequency band utilized in the relevant communication.

The wireless units 103-1 to 103-N transmit the produced signal via the antenna elements 104-1 to 104-N which are respectively connected to the wireless units 103-1 to 103-N.

In addition, the wireless units 103-1 to 103-N receive a signal sequence, which includes channel state information and is sent from each terminal device 200, via the antenna elements 104-1 to 104-N and convert the received signal sequence to a digital baseband signal to be output to the channel state information reproduction circuit 105.

The above channel state information is information which indicates propagation characteristics for a downstream link between each terminal device 200 and the present device (base station apparatus 100), that is, propagation characteristics obtained when a signal is transmitted from the base station apparatus 100 to each terminal device 200.

The channel state information reproduction circuit 105 reproduces the channel state information from the signal sequence input from the wireless units 103-1 to 103-N. The channel state information reproduction circuit 105 outputs the reproduced channel state information to the transmission weight computation circuit 106.

The channel state information reproduction by the channel state information reproduction circuit 105 is executed utilizing a method corresponding to a compression method employed for compressing the channel state information in the relevant terminal device 200. As the compression method and the reproduction method, those disclosed in Non-Patent Document 2 may be employed. Any methods other than those disclosed in Non-Patent Document 2 may also be utilized.

The transmission weight computation circuit 106 computes the transmission weight utilizing the channel state information input from the channel state information reproduction circuit 105. The transmission weight computation circuit 106 outputs the computed transmission weight.

The transmission weight computation may be performing utilizing a method disclosed in the following document:
K. Ishihara, Y. Asai, R. Ludo, T. Ichikawa, and M. Mizoguchi, "Indoor experiments on real-time multiuser MIMO transmission in wireless LAN systems", in Proc. IEEE Wireless Communications and Networking (WCNC), April 2012.
Another known method may also be utilized.

Next, the structure of the terminal devices 200 will be explained. As described above, since the terminal devices 200 have the same structure, the terminal device 200-1 will be explained here.

As shown in FIG. 1, the terminal device 200-1 includes antenna elements 201-1-1 to 201-1-M(1), wireless units 202-1-1 to 202-1-M(1), a reception signal demodulation circuit 203-1, a transmission signal generation circuit 204-1, a channel state information estimation circuit 205-1, and a channel state information compression circuit 206-1.

In the above, M(u) represents the number of antenna elements provided at the uth terminal device 200-u (u=1, ..., U). M(u) may be common between the wireless units 202-1-1 to 202-1-M(1), or the wireless units 202-1-1 to 202-1-M(1) may have individual values for M(u).

The antenna elements 201-1-1 to 201-1-M(1) are respectively connected to the wireless units 202-1-1 to 202-1-M(1) in a one-to-one correspondence manner.

The wireless units 202-1-1 to 202-1-M(1) receive a signal transmitted from the base station apparatus 100 via the antenna elements 201-1-1 to 201-1-M(1) (respectively connected to them) and convert the individual signals received via the antenna elements 201-1-1 to 201-1-M(1) to digital baseband signal sequences, which are output to the reception signal demodulation circuit 203-1 and the channel state information estimation circuit 205-1.

The wireless units 202-1-1 to 202-1-M(1) each convert a transmission signal, which is input from the transmission signal generation circuit 204-1, to an analog radio signal and send the converted radio signal via the antenna elements 201-1-1 to 201-1-M(1).

The reception signal demodulation circuit 203-1 demodulates and decodes a digital signal sequence output from each of the wireless units 202-1-1 to 202-1-M(1) to obtain a data sequence, which is output.

Similar to the transmission signal generation circuit 102 of the base station apparatus 100, the transmission signal generation circuit 204-1 performs signal generation. Here, each transmission signal is generated utilizing the channel state information compressed by the channel state information compression circuit 206-1 and output to the wireless units 202-1-1 to 202-1-M(1).

Based on a training signal sequence included in each digital signal sequence input from the wireless units 202-1-1 to 202-1-M(1), the channel state information estimation circuit 205-1 estimates the channel state information between the antenna elements 104-1 to 104-N at the base station apparatus 100 and the antenna elements 201-1-1 to 201-1-M(1).

The channel state information estimation is performed utilizing a known method. For example, the channel state information is estimated by an LS (Least Square) method (see a reference document: I. Barhumi, et al., "Optimal training design for MIMO OFDM systems in mobile wireless channels", IEEE Trans. Sig. Process., Vol. 51, No. 6, June 2003).

The channel state information compression circuit 206-1 subjects the channel state information estimated by the channel state information estimation circuit 205-1 to quantization and compression and outputs the processed information to the transmission signal generation circuit 204-1.

Similar to the above-described reproduction method, the channel state information compression may be executed utilizing a known method such as a method disclosed in Non-Patent Document 2.

In the above explanation of the present embodiment, the terminal device 200 sends only compressed channel state information. However, it may send a training signal sequence or another data signal.

Next, the operation performed between the base station apparatus 100 and the terminal devices 200 will be explained.

Figure 2:
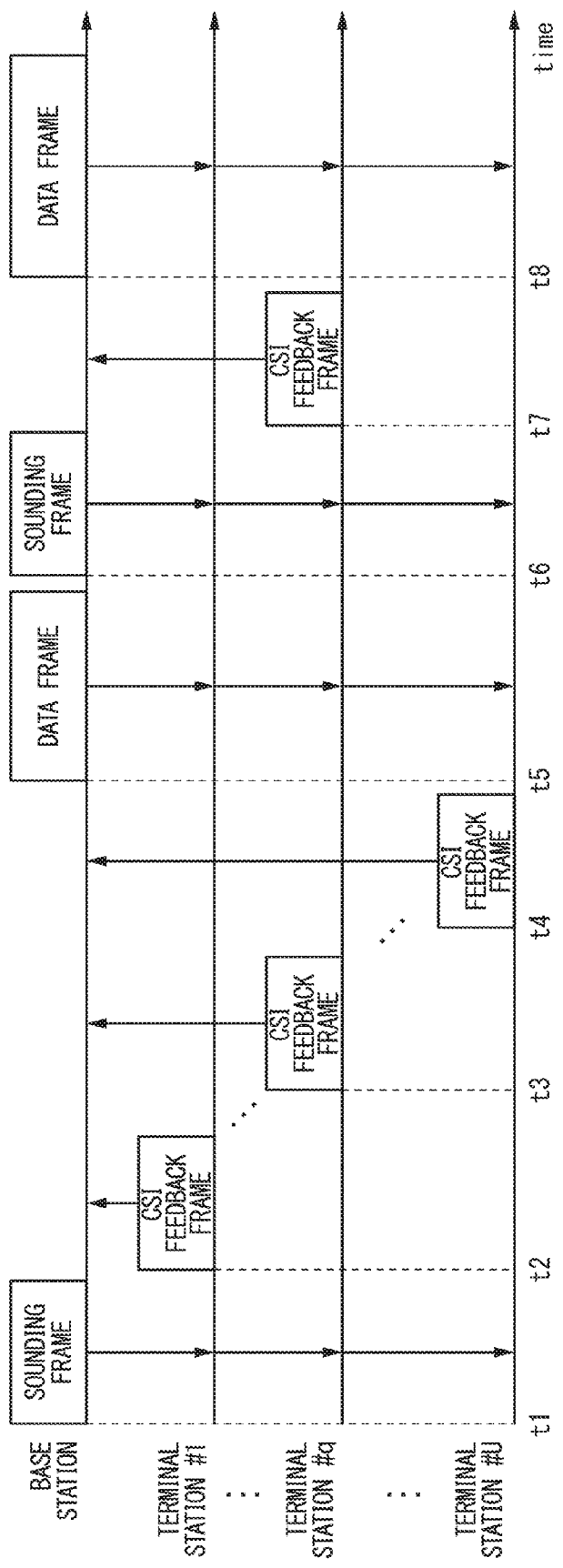
FIG. 2 is a frame sequence diagram that shows the operation performed between the base station apparatus 100 and the terminal devices 200 in the embodiment.

FIG. 2 is a frame sequence diagram that shows the operation performed between the base station apparatus 100 and the terminal devices 200 in the present embodiment. In FIG. 2, the horizontal axis indicates time, and the flow of frames sent from the base station apparatus 100 and the terminal devices 200 is shown along the axis.

In a case explained below, the channel state information between the base station apparatus 100 and the terminal device 200-q ($1 \leq q \leq U$) has varied and is updated.

For convenience of the explanation, the terminal devices 200-1, 200-q, and 200-U are represented as terminal stations #1, #q, and #U in FIG. 2 (and similar frame sequence diagrams explained later).

In the following explanation, the terminal device 200-u ($1 \leq q \leq U$) indicates any one of the terminal devices 200-1 to 200-U.

Additionally, in the upstream link transmission from the terminal devices 200 to the base station apparatus 100, communication utilizing TDMA (Time Division Multiple Access).

When each terminal device 200 feeds the channel state information back to the base station apparatus 100, the feedback is executed in a predetermined order (e.g., in ascending order from the first terminal device 200-1 to the last terminal device 200-U). Such an order for feeding back the channel state information from each terminal device 200 may be communicated from the base station apparatus 100 to each terminal device 200 for each feedback event.

In addition, each channel state information frame may be transmitted utilizing FDMA (Frequency Division Multiple Access) or SDMA (Space Division Multiple Access) other than TDMA.

First, in the base station apparatus 100, the data generation circuit 101 generates a training signal sequence, and the transmission signal generation circuit 102 generates a transmission signal from the training signal sequence generated by the data generation circuit 101. The wireless units 103-1 to 103-N then transmits the generated transmission signal, as a sounding frame (a known signal sequence), to each terminal device 200 via the antenna elements 104-1 to 104-N (see time t1).

In each terminal device 200-u, the wireless units 202-u-1 to 202-u-M(u) receive the sounding frame (sent from the base station apparatus 100) via the antenna elements 201-u-1 to 201-u-M(u).

The wireless units 202-u-1 to 202-u-M(u) convert the received sounding frame to a digital baseband signal sequence, and the channel state information estimation circuit 205-u estimates the channel state information based on the converted digital signal sequence.

The channel state information compression circuit 206-u subjects the channel state information, which has been estimated by the channel state information estimation circuit 205-u, to the quantization and compression and outputs the processed result to the transmission signal generation circuit 204-u. The transmission signal generation circuit 204-u converts the channel state information, which has been compressed by the channel state information compression circuit 206-u, into a transmission signal, and the wireless units 202-u-1 to 202-u-M(u) transmit the transmission signal as a channel state information feedback frame (CSI feedback frame) to the base station apparatus 100 via the antenna elements 201-u-1 to 201-u-M(u).

In this process, the terminal devices 200-1, 200-2, . . . , 200-U send the individual channel state information feedback frames at different timings (see times t2, t3, and t4).

In the base station apparatus 100, when the wireless units 103-1 to 103-N receive the signal transmitted from each terminal device 200-u via the antenna elements 104-1 to 104-N, the wireless units 103-1 to 103-N convert each received signal to a digital baseband signal, which is output to the channel state information reproduction circuit 105 sequentially.

The channel state information reproduction circuit 105 reproduces the compressed channel state information included in each digital baseband signal (converted by the wireless units 103-1 to 103-N) in order of the channel state information feedback frames (i.e., the above-described predetermined order).

The transmission weight computation circuit 106 computes the transmission weight based on the reproduced channel state information.

The transmission signal generation circuit 102 applies the above-described signal processing to the transmission signal input from the data generation circuit 101 and generates a multiuser MIMO radio signal utilizing the transmission weight computed by the transmission weight computation circuit 106. The transmission signal generation circuit 102 sends the generated radio signal as a data frame via the antenna elements 104-1 to 104-N to the terminal devices 200 (see time t5).

If signal sending is executed without performing the transmission beam forming (this case includes sending a sounding frame), the transmission signal generation circuit 102 performs no transmission beam forming.

In each terminal device 200-u, the wireless units 202-u-1 to 202-u-M(u) receive the radio signal (sent from the base station apparatus 100) via the antenna elements 201-u-1 to 201-u-M(u), where each wireless unit converts the received radio signal into a digital baseband signal to be output to the reception signal demodulation circuit 203-u.

The reception signal demodulation circuit 203-u demodulates and decodes the input digital signal to obtain a data sequence, which is output.

Next, in the base station apparatus 100, the data generation circuit 101 generates a training signal sequence, and the transmission signal generation circuit 102 generates a transmission signal from the training signal sequence generated by the data generation circuit 101. The wireless units 103-1 to 103-N then transmits the generated transmission signal, as a sounding frame, to each terminal device 200 via the antenna elements 104-1 to 104-N (see time t6).

In each terminal device 200-u, the wireless units 202-u-1 to 202-u-M(u) receive the sounding frame (from the base station apparatus 100) via the antenna elements 201-u-1 to 201-u-M (u). The wireless units 202-u-1 to 202-u-M(u) then convert the received sounding frame to a digital baseband signal sequence, and the channel state information estimation circuit 205-u estimates the channel state information based on the converted digital signal sequence again.

Then, in order to update the channel for the terminal device 200-q, channel state information (i.e., updated channel state information) is transmitted again from only the terminal device 200-q via a channel state information feedback frame to the base station apparatus 100 (see time t7).

In the base station apparatus 100, when the wireless units 103-1 to 103-N receive the signal transmitted from the terminal device 200-q via the antenna elements 104-1 to 104-N, the wireless units 103-1 to 103-N each convert the received signal to a digital baseband signal, which is output to the channel state information reproduction circuit 105 sequentially.

The channel state information reproduction circuit 105 reproduces the compressed channel state information included in each digital baseband signal (converted by the wireless units 103-1 to 103-N) from the channel state information feedback frame. The transmission weight updating circuit 107 then updates the transmission weight based on (i) the previous transmission weight computed by the transmission weight computation circuit 106 and the channel state information utilized in the relevant computation and (ii) the channel state information which has been reproduced and thus updated by the channel state information reproduction circuit 105.

The transmission signal generation circuit 102 applies the above-described signal processing to the transmission signal input from the data generation circuit 101 and generates a multiuser MIMO radio signal utilizing the transmission weight computed by the transmission weight updating circuit 107. The transmission signal generation circuit 102 transmits the generated radio signal as a data frame via the antenna elements 104-1 to 104-N to the terminal devices 200 (see time t8).

In each terminal device 200-u, the wireless units 202-u-1 to 202-u-M(u) receive the radio signal (sent from the base station apparatus 100) via the antenna elements 201-u-1 to 201-u-M(u), where each wireless unit converts the received radio signal into a digital baseband signal to be output to the reception signal demodulation circuit 203-u. The reception signal demodulation circuit 203-u demodulates and decodes the input digital signal to obtain a data sequence, which is output.

Next, the transmission weight generating process executed by the transmission weight updating circuit 107 provided in the base station apparatus 100 of the present embodiment will be explained.

The process explained here is executed after the above-described updated channel state information for the terminal device 200-q is received via the channel state information feedback frame. As described above, the relevant operation is performed utilizing the reproduced and updated channel state information to update the transmission weight.

In order to simplify the explanation, in a case explained below, each terminal device 200 has only one antenna element, that is, M(u)=1 (u=1, 2, . . . , U).

Figure 3:
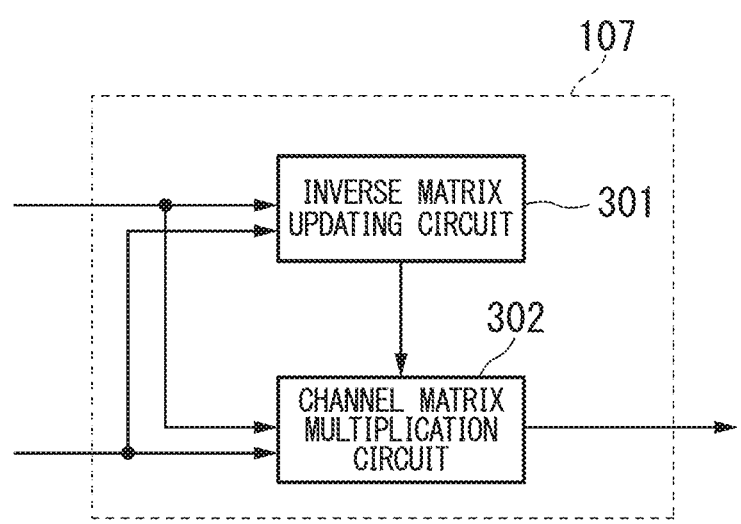
FIG. 3 is a block diagram showing the structure of the transmission weight updating circuit 107 in the embodiment.

FIG. 3 is a block diagram showing the structure of the transmission weight updating circuit 107 in the present embodiment. The transmission weight updating circuit 107 has an inverse matrix updating circuit 301 and a channel matrix multiplication circuit 302.

The inverse matrix updating circuit 301 performs updating of each inverse matrix by utilizing (i) inverse matrix $R(k)^{-1}$ of autocorrelation of each channel matrix computed when the transmission weight computation circuit 106 computed the transmission weight, and the channel state information of the terminal device 200-q, which was utilized in the relevant computation, and (ii) the updated channel state information of the terminal device 200-q, which was reproduced by the channel state information reproduction circuit 105 (k is a subcarrier number).

First, a component corresponding to the channel state information before the updating is subtracted from the inverse matrix $R(k)^{-1}$ of the autocorrelation of the channel matrix.

[Formula 1]
$$R'(k)^{-1} = R(k)^{-1} + \frac{p_q(k)p_q(k)^H}{r_q(k)} \quad (1)$$

wherein:
[Formula 2]
$$p_q(k) = R(k)^{-1}(h_q(k)^T)^H \quad (2)$$
[Formula 3]
$$r_q(k) = 1 - h_q(k)^T p_q(k) \quad (3)$$

In the above formulas, superscript H indicates the Hermitian transpose, and vector $h_q(k)$ denotes the kth frequency component of a channel state information vector for the downstream link from the base station apparatus 100 to the terminal device 200-u before the updating of the channel state information and is represented by Formula (4) below:
[Formula 4]
$$h_q(k) = [H_{q,1}(k), H_{q,2}(k), \ldots, H_{q,N}(k)]^T \quad (4)$$

where $H_{q,n}(k)$ denotes the kth frequency component of the estimated value of the channel state information for the downstream link from the nth antenna element of the base station apparatus 100 to the terminal device 200-q before the updating.

Next, a component corresponding to the updated channel state information is added to the inverse matrix $R'(k)^{-1}$ computed utilizing Formula (1):

[Formula 5]
$$R''(k)^{-1} = R'(k)^{-1} - \frac{p'_q(k)p'_q(k)^H}{r'_q(k)} \quad (5)$$

wherein:
[Formula 6]
$$p'_q(k) = R'(k)^{-1}(k)^{-1}(h'_q(k)^T)^H \quad (6)$$
[Formula 7]
$$r'_q(k) = 1 + h'_q(k)^T p'_q(k) \quad (7)$$

In the above formulas, vector $h'_q(k)$ denotes the kth frequency component of a channel state information vector for the downstream link from the base station apparatus 100 to the terminal device 200-q after the updating of the channel state information and is represented by Formula (8) below:
[Formula 8]
$$h'_q(k) = [H'_{q,1}(k), H'_{q,2}(k), \ldots, H'_{q,N}(k)]^T \quad (8)$$

where $H'_{q,n}(k)$ denotes the kth frequency component of the estimated value of the channel state information for the downstream link from the nth antenna element of the base station apparatus 100 to the terminal device 200-q after the updating.

The operation represented by Formulas (1) and (5) is executed, and inverse matrix $R''(k)^{-1}$, which was updated by the inverse matrix updating circuit 301 is output to the channel matrix multiplication circuit 302.

In Formulas (1) and (5), a sign opposite to "subtraction" or "addition" is employed apparently. In a recurrence formula as the source of Formula (1), a component corresponding to the channel state information has a negative sign. In order to subtract (i.e., cancel) this component, Formula (1) employs a positive sign. Similarly, Formula (5) employs a negative sign in the addition because in a recurrence formula as the source thereof, a component corresponding to the channel state information has a negative sign.

The channel matrix multiplication circuit 302 updates a transmission beam forming weight (i.e., transmission weight) by utilizing input values such as inverse matrix $R''(k)^{-1}$ computed by the inverse matrix updating circuit 301, the channel state information of all terminal stations before the updating, and the channel state information for the downstream link from the base station apparatus 100 to the terminal device 200-q after the updating.

Transmission beam forming weight $W(k)$ for the kth subcarrier is computed by Formula (9) below:

[Formula 9]
$$W(k) = (R''(k)^{-1})^T \begin{bmatrix} h_1(k)^T \\ \vdots \\ h'_q(k)^T \\ \vdots \\ h_U(k)^T \end{bmatrix}^H \quad (9)$$

The channel matrix multiplication circuit 302 output the computed transmission beam forming weight $W(k)$ as a new transmission weight to the transmission signal generation circuit 102.

As described above, the base station apparatus 100 utilizes the channel state information, which is fed back from only each terminal device 200 which has updated the channel state information, to update the inverse matrix of the channel state information (as a matrix) which indicates the propagation characteristics between the base station apparatus 100 and each terminal device 200. Therefore, it is unnecessary to perform recomputation of each inverse matrix by utilizing the channel state information for all terminal stations, and thereby the time required to compute the inverse matrix can be reduced.

That is, every time the channel state information reproduction circuit 105 acquires the updated channel state information, the transmission weight updating circuit 107 updates, based on the updated channel state information, inverse matrix $R_u(k)^{-1}$ which indicates the propagation characteristics between the base station apparatus 100 and every terminal device 200.

In this process, the transmission weight updating circuit 107 can update the inverse matrix without utilizing the channel state information for all terminal stations. According to the operation from Formula (1) to Formula (3) and the operation from Formula (5) to Formula (7), time required to compute the transmission weight $W(k)$ can be reduced in comparison with the computation of the inverse matrix of a channel state information matrix that indicates the propagation characteristics between the base station apparatus 100 and every terminal device 200.

As a result, time (overhead) required to compute the transmission weight $W(k)$ can be reduced and influence by a temporal variation in the propagation characteristics can also be reduced, which can improve the throughput of the wireless communication system.

The above-described first embodiment can be applied to both of FDD (Frequency Division Duplex) and TDD. In case of FDD, the frequency bands assigned to the upstream link and the downstream link are made different.

In the above explanation, only one terminal device 200-q is a target for the channel state information updating. However, channel state information updating for a plurality of terminal devices may be performed similarly.

Additionally in the above explanation, the channel state information feedback frame is sent from only the terminal station which needs the updating of the channel state information. However, it is possible that every terminal station sends the channel state information feedback frame and the base station apparatus 100 determines each terminal station which needs the updating of the channel state information so as to update the transmission weight utilizing only the channel state information corresponding to the determined terminal.

In the above explanation, resending of the sounding frame is performed so as to update the channel state information. However, the updated channel state information may be estimated utilizing a known signal sequence included in the relevant data frame.

Additionally, in the above frame sequence (FIG. 2), the last half (i.e., transmission of the sounding frame, the channel state information feedback frame, and the data frame, which are utilized to estimate the updated channel state information) may be repeated several times.

Theoretical Derivation

A theoretical derivation for Formulas (1) and (5) described above will be shown below. Generally, a ZF weight in the transmission beam forming is represented as follows (see Non-Patent Document 1):

[Formula 10]

$$W(k) = H(k)^H (H(k)H(k)^H + \delta I_U)^{-1} \quad (10)$$

wherein:

[Formula 11]

$$H(k) = \begin{bmatrix} h_1(k)^T \\ \vdots \\ h_U(k)^T \end{bmatrix} \quad (11)$$

In the above formulas, $I_U$ denotes a unit matrix of U×U, δ denotes a positive real number, and $SI_U$ represents a term utilized to reduce noise enhancement.

If "$H(k)H(k)^H + \delta I_U$" is a regular matrix, Formula (10) can be represented as follows.

[Formula 12]

$$W(k) = (H(k)^H H(k) + \delta I_N)^{-1} H(k)^H \quad (12)$$

Here, R(k) and $R_m(k)$ are defined as shown in formulas below.

[Formula 13]

$$R(k) = (H(k)^H H(k) + \delta I_N)^T = \sum_{l=1}^{U} (h_l(k)^T)^H h_l(k)^T + \delta I_N \quad (13)$$

[Formula 14]

$$R_m(k) = \sum_{l=1}^{m} (h_l(k)^T)^H h_l(k)^T + \delta I_N, m = 1, \ldots, U \quad (14)$$

where $R_0(k) = \delta I_N$ and $R_U(k) = R(k)$.

$R_m(k)$ can be represented in a recursive manner as shown in the following formula.

[Formula 15]

$$R_m(k) = R_{m-1}(k) + (h_m(k)^T)^H h_m(k)^T \quad (15)$$

In accordance with an inverse matrix operating formula for a matrix represented as a polynomial, the inverse matrix of $R_m(k)$ is described below based on Formula (15):

[Formula 16]

$$R_m(k)^{-1} = R_{m-1}(k)^{-1} - \frac{R_{m-1}(k)^{-1}(h_m(k)^T)^H h_m(k)^T R_{m-1}(k)^{-1}}{1 + h_m(k)^T R_{m-1}(k)^{-1}(h_m(k)^T)^H} \quad (16)$$

Accordingly, Formula (5) is obtained utilizing Formulas (6) and (7)

Similarly, the following formula is obtained by transforming Formula (15):

[Formula 17]

$$R_{m-1}(k) = R_m(k) - (h_m(k)^T)^H h_m(k)^T \quad (17)$$

In accordance with an inverse matrix operating formula for a matrix represented as a polynomial, the inverse matrix of $R_{m-1}(k)$ is described below based on Formula 17:

[Formula 18]

$$R_{m-1}(k)^{-1} = R_m(k)^{-1} + \frac{R_m(k)^{-1}(h_m(k)^T)^H h_m(k)^T R_m(k)^{-1}}{1 - h_m(k)^T R_m(k)^{-1}(h_m(k)^T)^H} \quad (18)$$

Accordingly, Formula (1) is obtained utilizing Formulas (2) and (3).

Second embodiment

Figure 4:
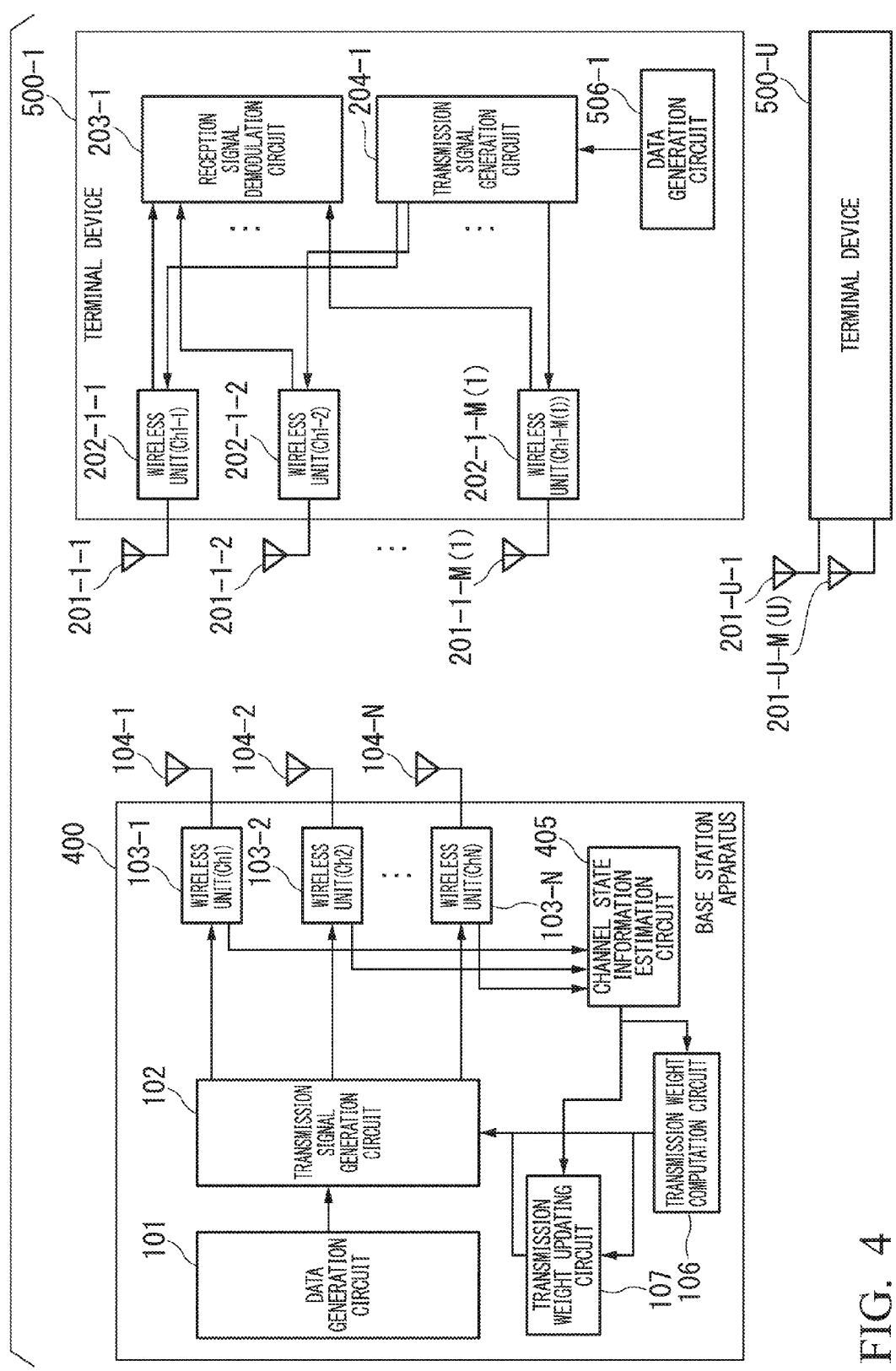
FIG. 4 is a block diagram showing the structure of a base station apparatus 400 and terminal devices 500-1 to 500-U, which are included in a wireless communication system of a second embodiment of the present invention.

FIG. 4 is a block diagram showing the structure of a base station apparatus 400 and terminal devices 500-1 to 500-U, which are included in a wireless communication system of a second embodiment.

In comparison with the wireless communication system of the first embodiment, the wireless communication system of the present embodiment has a distinctive feature that the system is formed based on TDD.

Additionally, the terminal devices 500-1 to 500-U of the wireless communication system have the same structure. Below, "terminal device 500" is utilized when indicating all terminal devices 500-1 to 500-U or any one thereof.

In addition, in the present wireless communication system, functional parts identical to those in the wireless communication system of the first embodiment are given identical reference numerals, and explanations thereof are omitted.

The base station apparatus 400 has a data generation circuit 101, a transmission signal generation circuit 102, wireless units 103-1 to 103-N (N is a natural number greater than or equal to 2), antenna elements 104-1 to 104-N, a channel state information estimation circuit 405, a transmission weight computation circuit 106, and a transmission weight updating circuit 107.

In comparison with the base station apparatus 100 (see FIG. 1), the base station apparatus 400 has a distinctive feature that the channel state information estimation circuit 405 is provided in place of the channel state information reproduction circuit 105.

The channel state information estimation circuit 405 detects a training signal sequence included in each signal sequence input from the wireless units 103-1 to 103-N. Based on the detected training signal sequence, the channel state information estimation circuit 405 estimates channel state information for the upstream link between the antenna elements 104-1 to 104-N provided at the base station apparatus 400 and the individual antenna elements provided at each terminal device 500.

The channel state information estimation circuit 405 also computes the channel state information for the downstream link by utilizing the estimated channel state information for the upstream link and a calibration value for a purpose of correction, which has been measured in advance. The channel state information estimation circuit 405 performs calibration utilizing a known technique which may be a method disclosed in Non-Patent Document 2.

Furthermore, the channel state information estimation circuit 405 outputs the computed channel state information for the downstream link to the transmission weight computation circuit 106 and the transmission weight updating circuit 107.

The terminal device 500-1 includes antenna elements 201-1-1 to 201-1-M(1), wireless units 202-1-1 to 202-1-M(1), a reception signal demodulation circuit 203-1, a transmission signal generation circuit 204-1, and a data generation circuit 506-1.

In comparison with the terminal device 200-1 (see FIG. 1), the terminal device 500-1 has a distinctive feature that the data generation circuit 506-1 is provided in place of the channel state information estimation circuit 205-1 and the channel state information compression circuit 206-1. This is because in the present embodiment in which the base station apparatus 400 estimates the channel state information, no feedback of channel state information from the terminal device 500 to the base station apparatus 400 is necessary.

The data generation circuit 506-1 generates (i) a training signal sequence utilized to estimate the channel state information between the antenna elements provided at each terminal device 500 (here, 500-1) and the antenna elements 104-1 to 104-N provided at the base station apparatus 400, and (ii) a transmission data sequence transmitted from the terminal device 500-1 to the base station apparatus 400. The data generation circuit 506-1 outputs the generated training signal sequence and the generated transmission data sequence to the transmission signal generation circuit 204-1.

Next, the operation performed between the base station apparatus 400 and the terminal devices 500 will be explained.

Figure 5:
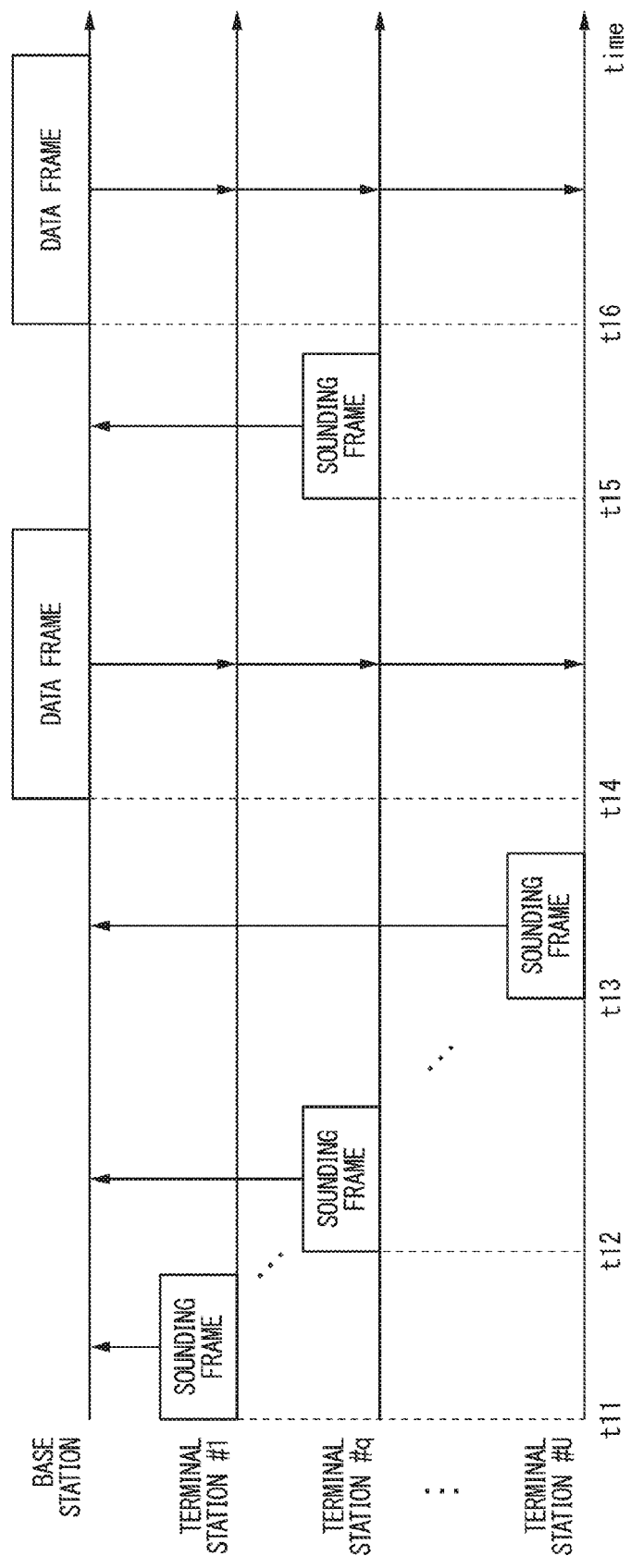
FIG. 5 is a frame sequence diagram that shows the operation performed between the base station apparatus 400 and the terminal devices 500 in the second embodiment.

FIG. 5 is a frame sequence diagram that shows the operation performed between the base station apparatus 400 and the terminal devices 500 in the present embodiment. In FIG. 5, the horizontal axis indicates time, and the flow of frames sent from the base station apparatus 400 and the terminal devices 500 is shown along the axis.

In the following explanation, the terminal device 500-u ($1 \leq u \leq U$) indicates any one of the terminal devices 500-1 to 500-U.

Additionally, communication utilizing TDMA is performed between the base station apparatus 400 and the terminal devices 500.

In the following operation, when each terminal device 500 sends a training signal sequence to the base station apparatus 400, the sending is executed in a predetermined order (e.g., in ascending order from the first terminal device 500-1 to the last terminal device 500-U).

In the terminal device 500-u, the data generation circuit 506-u generates a training signal sequence utilized to estimate the channel state information for the upstream link and output it to the transmission signal generation circuit 204-u.

The transmission signal generation circuit 204-u generates a transmission signal from the training signal sequence generated by the data generation circuit 506-u.

The wireless units 202-u-1 to 202-u-M(u) send, via the antenna elements 201-u-1 to 201-u-M(u), the transmission signal (generated by the transmission signal generation circuit 204-u) as a sounding frame to the base station apparatus 400 (see times t11, t12, and t13).

In this process, relevant sounding frames are sent sequentially by means of TDMA, where the transmission order thereof may be predetermined or may be communicated from the base station apparatus 400 to each terminal device 500 in advance.

In the base station apparatus 400, the wireless units 103-1 to 103-N receive, via the antenna elements 104-1 to 104-N, the sounding frames (sent from the terminal devices 500) in order corresponding to the transmission sequence and each wireless unit convert a signal included in each received sounding frame to a digital baseband signal.

The channel state information estimation circuit 405 detects a training signal sequence included in each digital signal (converted by the wireless units 103-1 to 103-N) and estimates the channel state information for the upstream link between the present apparatus and the terminal device 500 which sent the relevant training signal sequence. Based on the estimated channel state information for the upstream link and a calibration value for a purpose of correction, which has been measured in advance, the channel state information estimation circuit 405 estimates the channel state information for the downstream link The transmission weight computation circuit 106 executes the relevant operation utilizing the channel state information estimated by the channel state information estimation circuit 405 so as to compute a transmission weight, which is output to the transmission signal generation circuit 102.

The transmission signal generation circuit 102 applies the above-described signal processing to the transmission signal input from the data generation circuit 101 and generates a multiuser MIMO radio signal utilizing the transmission weight computed by the transmission weight computation circuit 106. The transmission signal generation circuit 102 sends the generated radio signal as a data frame via the antenna elements 104-1 to 104-N to the terminal devices 500 (see time t14).

In each terminal device 500-u, the wireless units 202-u-1 to 202-u-M(u) receive the radio signal (transmitted from the base station apparatus 400) via the antenna elements 201-u-1 to 201-u-M(u), where each wireless unit converts the received radio signal into a digital baseband signal to be output to the reception signal demodulation circuit 203-u.

The reception signal demodulation circuit 203-u demodulates and decodes the input digital signal to obtain a data sequence, which is output.

Next, in the terminal device 500-q for which the channel state information is to be updated, the data generation circuit 506-q generates a training signal sequence which is utilized to estimate the channel state information for the upstream link and is output to the transmission signal generation circuit 204-q.

The transmission signal generation circuit 204-q generates a transmission signal from the training signal sequence generated by the data generation circuit 506-q.

The wireless units 202-q-1 to 202-q-M(q) transmit, via the antenna elements 201-q-1 to 201-q-M(q), the transmission signal (generated by the transmission signal generation circuit 204-q) as a sounding frame to the base station apparatus 400 (see time t15).

In the base station apparatus 400, the wireless units 103-1 to 103-N receive the above sounding frame via the antenna elements 104-1 to 104-N and convert a signal included in the received sounding frame to a digital baseband signal.

The channel state information estimation circuit 405 detects a training signal sequence included in the digital signal (converted by the wireless units 103-1 to 103-N) and estimates the channel state information for the upstream link between the present apparatus and the terminal device 500 (here, 500-q) which sent the relevant training signal sequence. Based on the estimated updated channel state information for the upstream link and the above-described calibration value, the channel state information estimation circuit 405 estimates the updated channel state information for the downstream link.

The transmission weight updating circuit 107 updates the transmission weight utilizing (i) the updated channel state information estimated by the channel state information estimation circuit 405, (ii) the transmission weight computed by the transmission weight computation circuit 106 before the updating and the channel state information (before the updating) utilized in this computation. The updated transmission weight is transmitted to the transmission signal generation circuit 102.

The transmission signal generation circuit 102 applies the above-described signal processing to the transmission signal input from the data generation circuit 101 and generates a multiuser MIMO radio signal utilizing the transmission weight updated by the transmission weight updating circuit 107. The transmission signal generation circuit 102 transmits the generated radio signal as a data frame via the antenna elements 104-1 to 104-N to the terminal devices 500 (see time t16).

If signal sending is executed without performing the transmission beam forming, the transmission signal generation circuit 102 performs no transmission beam forming.

In each terminal device 500-u, the wireless units 202-u-1 to 202-u-M(u) receive the radio signal (transmitted from the base station apparatus 400) via the antenna elements 201-u-1 to 201-u-M(u), where each wireless unit converts the received radio signal into a digital baseband signal to be output to the reception signal demodulation circuit 203-u.

The reception signal demodulation circuit 203-u demodulates and decodes the input digital signal to obtain a data sequence, which is output.

As described above, similar to the first embodiment, the wireless communication system of the present embodiment can reduce time required to compute the inverse matrix for the channel state information after the updated channel state information is obtained. Therefore, time (overhead) required to update the transmission weight W(k) can be reduced, and influence by a temporal variation in the propagation characteristics can also be reduced, which can improve the throughput of the wireless communication system.

In the above-described embodiments (for operation), each terminal device 200 or 500 employ one antenna element. However, a plurality of antenna elements may be employed.

In such a case, a plurality of channel state information vectors are obtained as the channel state information for the terminal device 200 or 500. The obtained individual vectors may be regarded as channel state information vectors for different terminal devices, so that operations similar to those explained above can be performed.

In the wireless communication system of the above-described first and second embodiments, the base station apparatus 100 or 400 transmits an OFDM signal. However, a single carrier signal or the like may be transmitted.

Additionally in each embodiment, transmission based on the multiuser MIMO has been explained as an example. However, the present invention is not limited to the multiuser MIMO and can be applied to any wireless communication system that performs transmission together with the beam forming.

In each of the above-described embodiments, whether or not the transmission weight is to be updated may be determined in a manner such that cross correlation between the channel state information items before and after the updating thereof is computed, where the transmission weight is to be updated if the relevant correlation value is lower than a predetermined threshold and not to be updated if it is not. In another example, a coherence time (i.e., time capable of establishing synchronism (making communication)) is assigned to each terminal station, and the transmission weight is to be updated only when a time longer than the coherence time has elapsed, from the time when the channel state information was obtained or estimated, without a variation (or with a variation less than or equal to a permissible value) in the propagation characteristics due to movement of any terminal or a change in peripheral environments.

In wireless propagation environments, movement of any terminal or a change in peripheral environments causes a fading, which may degrade the propagation characteristics. In particular, in the multiuser MIMO transmission in which the transmitting apparatus performs the beam forming, if there is a variation between the channel state information utilized in the beam forming computation and the channel state information at the time of actual transmission, no desired beam forming may be established and the relevant characteristics may be degraded. Accordingly, the degree of channel variation in a prepared environment is measured in advance, so as to determine the above coherence time.

In the above explanation for the transmission weight updating method, a signal terminal station updates the channel state information and continues to perform the multiuser MIMO transmission. However, this is not an absolute condition, and the present invention can also be applied to a case in which a terminal station is removed from the multiuser MIMO transmission or a case in which a terminal station is newly added to the members of the multiuser MIMO transmission.

Additionally, the inverse matrix updating circuit 301 performs updating of each inverse matrix by utilizing (i) inverse matrix $R(k)^{-1}$ of autocorrelation of each channel matrix computed when the transmission weight computation circuit 106 computed the transmission weight, and the channel state information of the terminal device 200-q, which was utilized in the relevant computation, and (ii) the updated channel state information of the terminal device 200-q, which was reproduced by the channel state information reproduction circuit 105 (k is a subcarrier number).

For example, when removing a terminal station q' from the multiuser MIMO transmission in the first embodiment, a component corresponding to the channel state information for the terminal station q' is subtracted from the inverse matrix $R(k)^{-1}$ of the autocorrelation of the channel matrix, as follows:

[Formula 19]

$$\tilde{R}'(k)^{-1} = R(k)^{-1} + \frac{p_{q'}(k) p_{q'}(k)^H}{r_{q'}(k)} \quad (19)$$

wherein:
[Formula 20]

$$p_q(k) = R(k)^{-1}(h_q(k)^T)^H \quad (20)$$

[Formula 21]

$$r_q(k) = 1 - h_q(k)^T p_q(k) \quad (21)$$

The operation according to Formula (19) is executed, and inverse matrix $\tilde{R}'(k)^{-1}$ updated by the inverse matrix updating circuit 301 is output to the channel matrix multiplication circuit 302.

The channel matrix multiplication circuit 302 utilizes the inverse matrix $\tilde{R}'(k)^{-1}$ output from the inverse matrix updating circuit 301 and the channel state information of all terminal stations except for the terminal station q' as input data to update the transmission beam forming weight (i.e., transmission weight).

Transmission beam forming weight W(k) for the kth subcarrier is computed by Formula (22) below:

[Formula 22]

$$W(k) = \left(\tilde{R}'(k)^{-1}\right)^T \begin{bmatrix} h_1(k)^T \\ \vdots \\ h_{q'-1}(k)^T \\ h_{q'+1}(k)^T \\ \vdots \\ h_N(k)^T \end{bmatrix}^H \quad (22)$$

The channel matrix multiplication circuit 302 output the computed transmission beam forming weight W(k) as a new transmission weight to the transmission signal generation circuit 102.

The next case will be explained below, in which a new terminal station q is newly added to the members of the multiuser MIMO transmission.

In this case, a component corresponding to the channel state information for the terminal station q' is added to the inverse matrix $R(k)^{-1}$ of the autocorrelation of the channel matrix, as follows:

[Formula 23]

$$\tilde{R}''(k)^{-1} = R(k)^{-1} - \frac{p_{q'}(k) p_{q'}(k)^H}{r_{q'}(k)} \quad (23)$$

wherein:
[Formula 24]

$$p_q(k) = R(k)^{-1}(h_q(k)^T)^H \quad (24)$$

[Formula 25]

$$r_q(k) = 1 + h_q(k)^T p_q(k) \quad (25)$$

The operation according to Formula (23) is executed, and inverse matrix $\tilde{R}''(k)^{-1}$ updated by the inverse matrix updating circuit 301 is output to the channel matrix multiplication circuit 302.

The channel matrix multiplication circuit 302 utilizes (i) the inverse matrix $\tilde{R}''(k)^{-1}$ output from the inverse matrix updating circuit 301, (ii) the channel state information of all terminal stations before the updating, and (iii) the channel state information of the newly-added terminal station q' for the downstream link from the base station apparatus 100 to the terminal device 200-q', as input data to update the transmission beam forming weight (i.e., transmission weight).

Transmission beam fainting weight W(k) for the kth subcarrier is computed by Formula (26) below:

[Formula 26]

$$W(k) = \left(\tilde{R}''(k)^{-1}\right)^T \begin{bmatrix} h_1(k)^T \\ \vdots \\ h_N(k)^T \\ h_{q'}(k)^T \end{bmatrix} \quad (26)$$

The channel matrix multiplication circuit 302 output the computed transmission beam forming weight W(k) as a new transmission weight to the transmission signal generation circuit 102. Here, such deletion or addition of the terminal station q' can also be applied to the second embodiment in a similar manner.

As described above, when a terminal station can be appropriately added to or deleted from a multiuser MIMO transmission system, it is possible to easily perform the updating of the transmission weight by means of the scheduling (i.e., combination) between the terminal stations in the multiuser MIMO transmission system.

For example, if multiuser MIMO transmission performed with a certain combination has produced a large error rate and thus the transmission has not been accurately executed, then the multiuser MIMO transmission may be executed again with a reduced number of the terminals. In contrast, if accurate transmission has been performed and thus the margin for the number of multiplexed terminals is sufficient, the number of the terminals may be increased to execute the multiuser MIMO transmission.

Additionally, if only a specific terminal station cannot accurately transmit information via the multiuser MIMO transmission, this terminal station may be removed from the members for the transmission so as to improve the relevant throughput.

Figure 6:
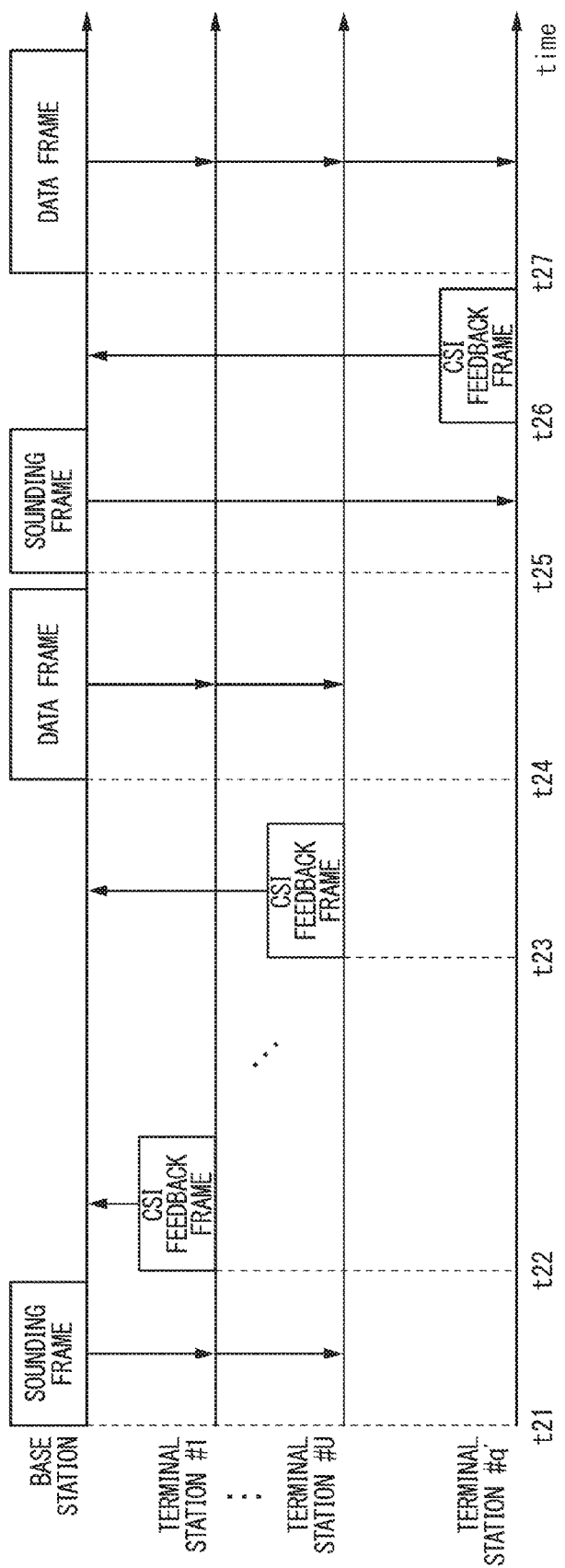
FIG. 6 is a frame sequence diagram for a case in which a terminal station q' is added to the multiuser MIMO transmission system in the first embodiment.

FIG. 6 is a frame sequence diagram for a case in which a terminal station q' is added to the multiuser MIMO transmission system in the first embodiment. In FIG. 6, the horizontal axis indicates time, and the flow of frames sent from the base station apparatus 100 and the terminal devices 200 is shown along the axis.

First, in the base station apparatus 100, the data generation circuit 101 generates a training signal sequence, and the transmission signal generation circuit 102 generates a transmission signal from the training signal sequence generated by the data generation circuit 101. The wireless units 103-1 to 103-N then transmits the generated transmission signal, as a sounding frame, to each terminal device 200 via the antenna elements 104-1 to 104-N (see time t21).

In each terminal device 200-u, the wireless units 202-u-1 to 202-u-M(u) receive the sounding frame (sent from the base station apparatus 100) via the antenna elements 201-u-1 to 201-u -M(u).

The wireless units 202-u-1 to 202-u-M(u) convert the received sounding frame to a digital baseband signal sequence, and the channel state information estimation circuit 205-u estimates the channel state information based on the converted digital signal sequence.

The channel state information compression circuit 206-u subjects the channel state information, which has been estimated by the channel state information estimation circuit 205-u, to the quantization and compression and outputs the processed result to the transmission signal generation circuit 204-u.

The transmission signal generation circuit 204-u converts the channel state information, which has been compressed by the channel state information compression circuit 206-u, into a transmission signal, and the wireless units 202-u-1 to 202-u-M(u) send the transmission signal as a channel state information feedback frame (CSI feedback frame) to the base station apparatus 100 via the antenna elements 201-u-1 to 201-u-M(u) (see times t22 and t23).

In the base station apparatus 100, when the wireless units 103-1 to 103-N receive the signal sent from each terminal device 200-u via the antenna elements 104-1 to 104-N, the wireless units 103-1 to 103-N convert each received signal to a digital baseband signal, which is output to the channel state information reproduction circuit 105 sequentially.

The channel state information reproduction circuit 105 reproduces the compressed channel state information included in each digital baseband signal (converted by the wireless units 103-1 to 103-N) in order of the channel state information feedback frames.

The transmission weight computation circuit 106 computes the transmission weight based on the reproduced channel state information.

The transmission signal generation circuit 102 applies the above-described signal processing to the transmission signal input from the data generation circuit 101 and generates a multiuser MIMO radio signal utilizing the transmission weight computed by the transmission weight computation circuit 106. The transmission signal generation circuit 102 sends the generated radio signal as a data frame via the antenna elements 104-1 to 104-N to the terminal devices 200 (see time t24).

If signal sending is executed without performing the transmission beam forming (this case includes sending a sounding frame), the transmission signal generation circuit 102 performs no transmission beam forming.

In each terminal device 200-u, the wireless units 202-u-1 to 202-u-M(u) receive the radio signal (sent from the base station apparatus 100) via the antenna elements 201-u-1 to 201-u-M(u), where each wireless unit converts the received radio signal into a digital baseband signal to be output to the reception signal demodulation circuit 203-u.

The reception signal demodulation circuit 203-u demodulates and decodes the input digital signal to obtain a data sequence, which is output.

Next, if the terminal station q' is to be newly added to the system which performs the multiuser MIMO transmission, then in the base station apparatus 100, the data generation circuit 101 generates a training signal sequence, and the transmission signal generation circuit 102 generates a transmission signal from the training signal sequence generated by the data generation circuit 101. The wireless units 103-1 to 103-N then transmits the generated transmission signal, as a sounding frame, to the terminal device 200-q' via the antenna elements 104-1 to 104-N (see time t25).

In the terminal device 200-q', the wireless units 202-q'-1 to 202-q'-M(q') receive the sounding frame (sent from the base station apparatus 100) via the antenna elements 201-q'-1 to 201-q'-M(q').

The wireless units 202-q'-1 to 202-q'-M(q') then convert the received sounding frame to a digital baseband signal sequence, and the channel state information estimation circuit 205-q' estimates the channel state information based on the converted digital signal sequence.

After that, the channel state information is sent to the base station apparatus 100 from only the terminal device 200-q' via a channel state information feedback frame (see time t26).

In the base station apparatus 100, when the wireless units 103-1 to 103-N receive the signal sent from the terminal device 200-q' via the antenna elements 104-1 to 104-N, the wireless units 103-1 to 103-N each convert the received signal to a digital baseband signal, which is output to the channel state information reproduction circuit 105.

The channel state information reproduction circuit 105 reproduces the compressed channel state information included in each digital baseband signal (converted by the wireless units 103-1 to 103-N) from the channel state information feedback frame.

The transmission weight updating circuit 107 then updates the transmission weight based on (i) the previous transmission weight computed by the transmission weight computation circuit 106 and the channel state information utilized in the relevant computation and (ii) the channel state information of the terminal station q', which has been reproduced by the channel state information reproduction circuit 105.

The transmission signal generation circuit 102 applies the above-described signal processing to the transmission signal input from the data generation circuit 101 and generates a multiuser MIMO radio signal utilizing the transmission weight computed by the transmission weight updating circuit 107. The transmission signal generation circuit 102 transmits the generated radio signal as a data frame via the antenna elements 104-1 to 104-N to the terminal devices 200 (see time t27).

In each of the terminal devices 200-1 to 200-U and 200-u', the wireless units 202-u-1 to 202-u-M(u) receive the radio signal (sent from the base station apparatus 100) via the antenna elements 201-u-1 to 201-u-M(u), where each wireless unit converts the received radio signal into a digital baseband signal to be output to the reception signal demodulation circuit 203-u.

The reception signal demodulation circuit 203-u demodulates and decodes the input digital signal to obtain a data sequence, which is output.

Figure 7:
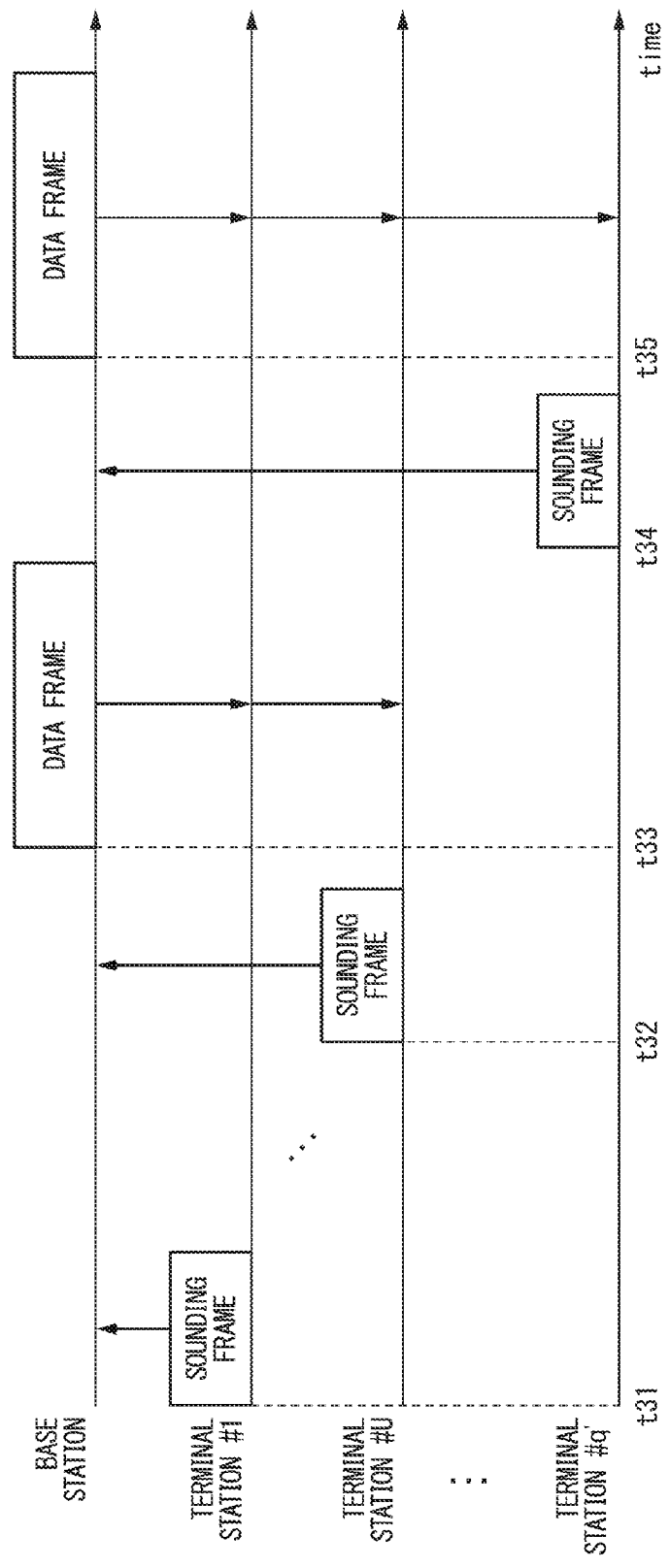
FIG. 7 is a frame sequence diagram for a case in which a terminal station q' is added to the multiuser MIMO transmission system in the second embodiment.

FIG. 7 is a frame sequence diagram for a case in which a terminal station q' is added to the multiuser MIMO transmission system in the second embodiment.

In comparison with the wireless communication system of the first embodiment, the wireless communication system of the second embodiment has a distinctive feature that the system is formed based on TDD.

In the case of FIG. 7, when the base station apparatus 400 performs the multiuser MIMO transmission together with the terminal devices 200-1 to 200-U, the terminal station q' is newly added to the relevant system which executes the multiuser MIMO transmission.

After sending sounding frames (see times t31 and t32), the base station apparatus 400 sends a data frame (see time t33). After that, a sounding frame is transmitted from the terminal device 200-q' (see time t34). Then in the base station apparatus 400, the channel state information of the terminal device 200-q' is newly estimated by the channel state information estimation circuit 405 and the transmission weight updating circuit 107 updates the transmission weight, so that not the terminal devices 200-1 to 200-U but also the terminal device 200-q' participates in the multiuser MIMO transmission to transmit data frames (see time t35).

Figure 8:
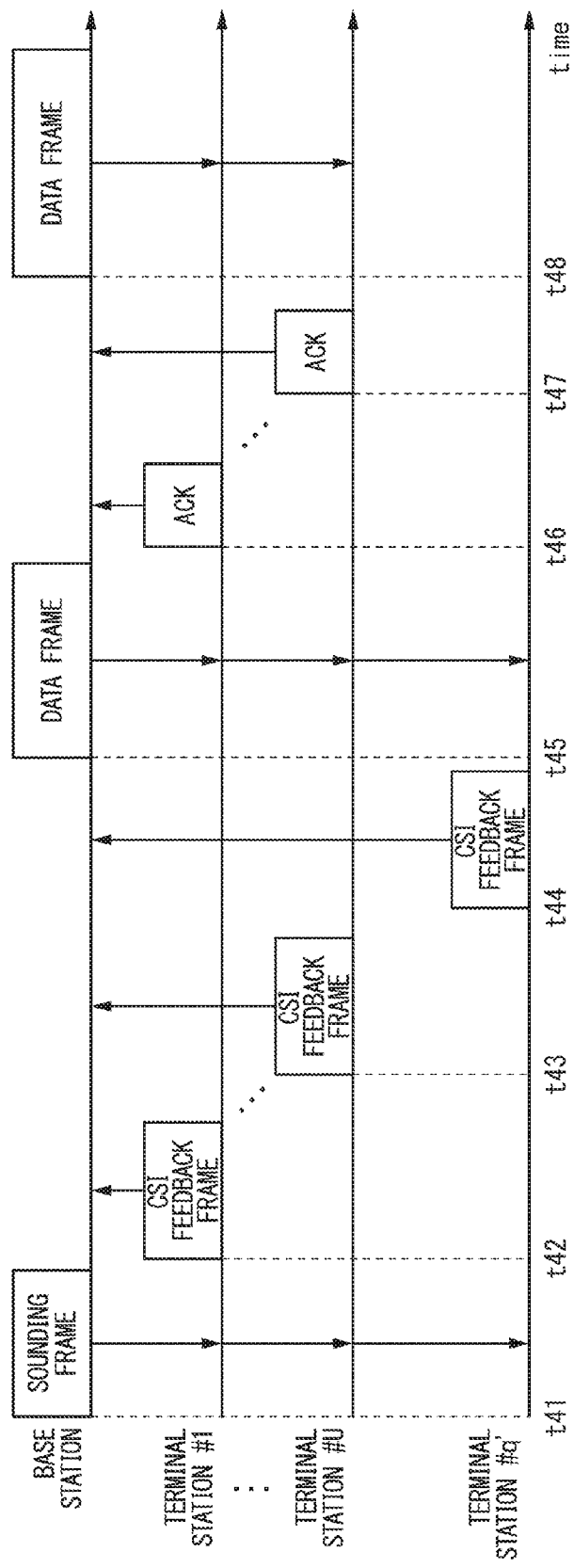
FIG. 8 is a frame sequence diagram for a case in which a terminal station q' is deleted from the multiuser MIMO transmission system in the first embodiment.

FIG. 8 is a frame sequence diagram for a case in which a terminal station q' is deleted from the multiuser MIMO transmission system in the first embodiment. In FIG. 8, the horizontal axis indicates time, and the flow of frames sent from the base station apparatus 100 and the terminal devices 200 is shown along the axis.

In comparison with FIG. 6, FIG. 8 has a distinctive feature of removing the terminal station q' from the system that performs the multiuser MIMO transmission while the base station apparatus 100 executes the multiuser MIMO transmission together with the terminal devices 200-1 to 200-U and 200-q'.

First, in the base station apparatus 100, the data generation circuit 101 generates a training signal sequence, and the transmission signal generation circuit 102 generates a transmission signal from the training signal sequence generated by the data generation circuit 101. The wireless units 103-1 to 103-N then sends the generated transmission signal, as a sounding frame, to each terminal device 200 via the antenna elements 104-1 to 104-N (see time t41).

In each terminal device 200-u" (u" indicates "1 to U and q'"), the wireless units 202-u"-1 to 202-u"-M(u") receive the sounding frame (sent from the base station apparatus 100) via the antenna elements 201-u"-1 to 201-u"-M(u").

The wireless units 202-C-1 to 202-u"-M(u") convert the received sounding frame to a digital baseband signal sequence, and the channel state information estimation circuit 205-u" estimates the channel state information based on the converted digital signal sequence.

The channel state information compression circuit 206-u" subjects the channel state information, which has been estimated by the channel state information estimation circuit 205-u", to the quantization and compression and outputs the processed result to the transmission signal generation circuit 204-u".

The transmission signal generation circuit 204-u" converts the channel state information, which has been compressed by the channel state information compression circuit 206-u", into a transmission signal, and the wireless units 202-u"-1 to 202-u"-M(u") send the transmission signal as a channel state information feedback frame (CSI feedback frame) to the base station apparatus 100 via the antenna elements 201-u"-1 to 201-u"-M(u") (see times t42, t43, and t44).

In the base station apparatus 100, when the wireless units 103-1 to 103-N receive the signal sent from each terminal device 200-u" via the antenna elements 104-1 to 104-N, the wireless units 103-1 to 103-N convert each received signal to a digital baseband signal, which is output to the channel state information reproduction circuit 105 sequentially.

The channel state information reproduction circuit 105 reproduces the compressed channel state information included in each digital baseband signal (converted by the wireless units 103-1 to 103-N) in order of the channel state information feedback frames.

The transmission weight computation circuit 106 computes the transmission weight based on the reproduced channel state information.

The transmission signal generation circuit 102 applies the above-described signal processing to the transmission signal input from the data generation circuit 101 and generates a multiuser MIMO radio signal utilizing the transmission weight computed by the transmission weight computation circuit 106. The transmission signal generation circuit 102 sends the generated radio signal as a data frame via the antenna elements 104-1 to 104-N to the terminal devices 200 (see time t45).

If signal sending is executed without performing the transmission beam forming (this case includes sending a sounding frame), the transmission signal generation circuit 102 performs no transmission beam forming.

In each terminal device 200-u", the wireless units 202-u"-1 to 202-u"-M(u") receive the radio signal (sent from the base station apparatus 100) via the antenna elements 201-u"-1 to 201-u"-M(u"), where each wireless unit converts the received radio signal into a digital baseband signal to be output to the reception signal demodulation circuit 203-u".

The reception signal demodulation circuit 203-u" demodulates and decodes the input digital signal to obtain a data sequence, which is output.

Here, it is assumed that the data frame was accurately transmitted to the terminal devices 200-1 to 200-U but was not accurately transmitted to the terminal device 200-q' (i.e., the relevant data included an error).

In this case, an ACK frame is sent from each of the terminal devices 200-1 to 200-U (see times t46 and t47) while no ACK frame is transmitted from the terminal device 200-q'. The ACK frame is a frame returned as a response when the relevant data frame has been accurately received and may employ a frame format disclosed in Non-Patent Document 2.

The base station apparatus 100 receives the ACK frames transmitted from the terminal devices 200-1 to 200-U. As a result, the base station apparatus 100 determines that the terminal device 200-u' cannot perform accurate transmission even if it participates in the multiuser MIMO transmission, and the translation device 100 performs the multiuser MIMO transmission while removing the terminal device 200-u' from the system. Accordingly, in the base station apparatus 100, the transmission weight updating circuit 107 deletes the channel state information of the terminal device 200-q' to update the transmission weight.

The transmission signal generation circuit 102 applies the above-described signal processing to the transmission signal input from the data generation circuit 101 and generates a multiuser MIMO radio signal utilizing the transmission weight computed by the transmission weight updating circuit 107. The transmission signal generation circuit 102 sends the generated radio signal as a data frame via the antenna elements 104-1 to 104-N to the terminal devices 200 (see time t48).

In each of the terminal devices 200-1 to 200-U, the wireless units 202-u-1 to 202-u-M(u) receive the radio signal (sent from the base station apparatus 100) via the antenna elements 201-u-1 to 201-u-M(u), where each wireless unit converts the received radio signal into a digital baseband signal to be output to the reception signal demodulation circuit 203-u.

The reception signal demodulation circuit 203-u demodulates and decodes the input digital signal to obtain a data sequence, which is output.

Figure 9:
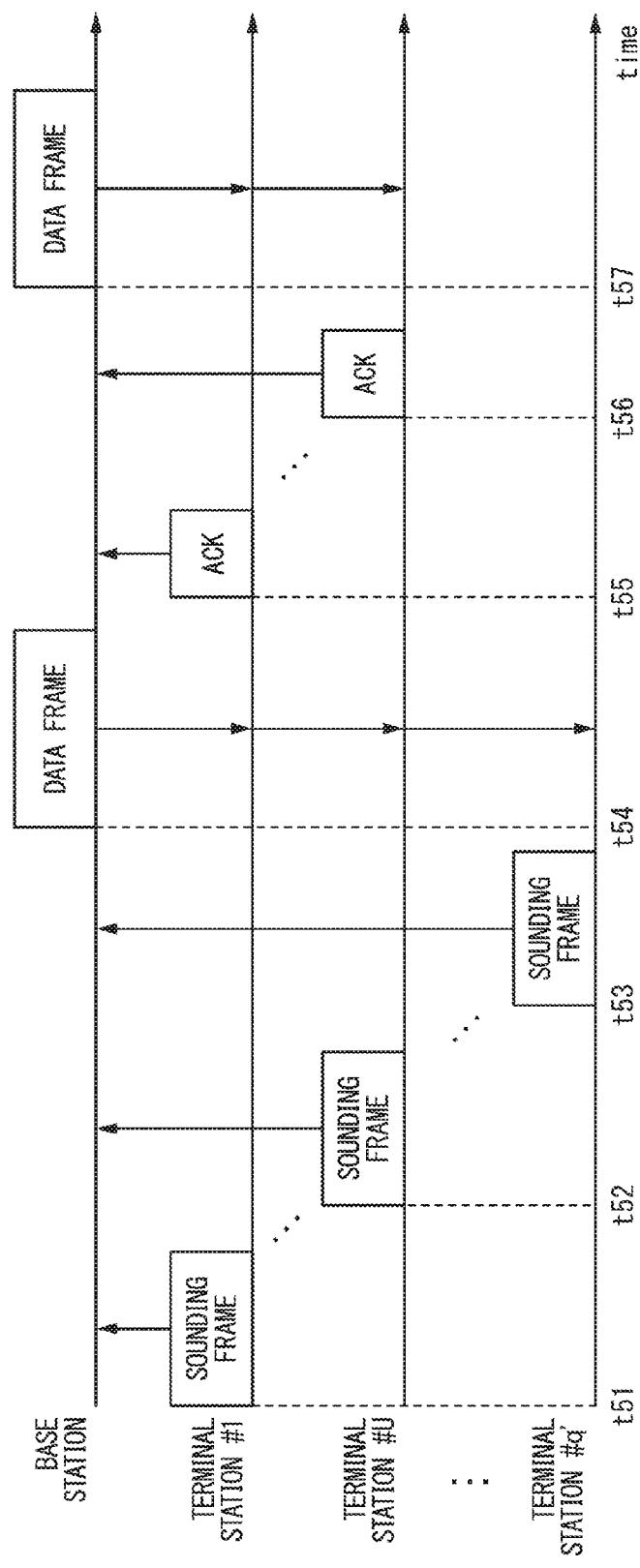
FIG. 9 is a frame sequence diagram for a case in which a terminal station q' is deleted from the multiuser MIMO transmission system in the second embodiment.
Figure 10:
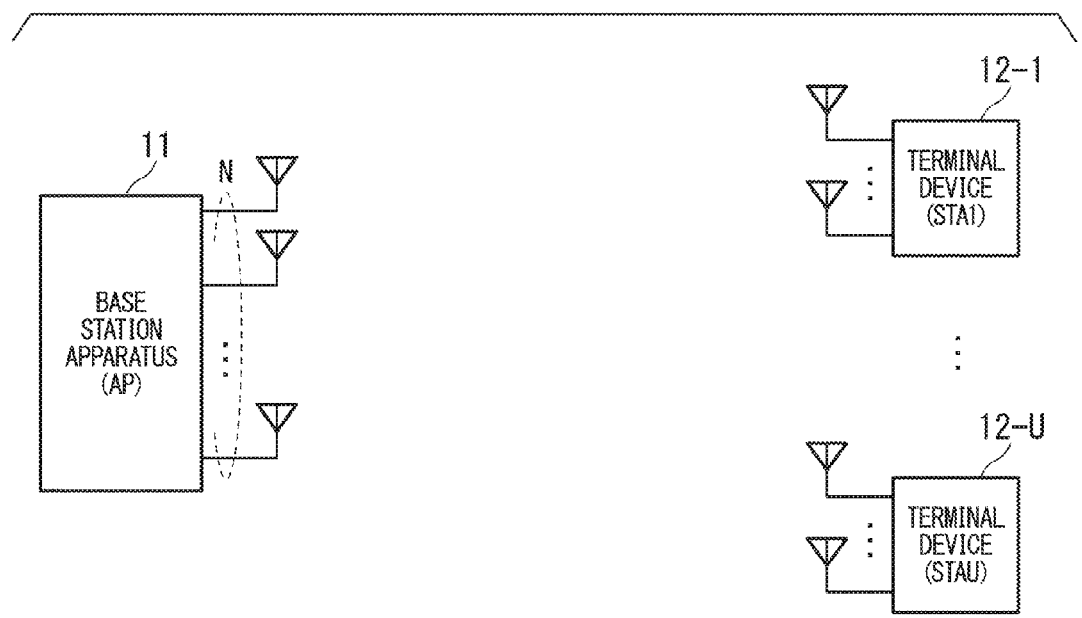
FIG. 10 is a diagram that shows the structure of a wireless communication system to which the multiuser MIMO transmission technique is applied.

FIG. 9 is a frame sequence diagram for a case in which a terminal station q' is deleted from the multiuser MIMO transmission system in the second embodiment.

In comparison with the wireless communication system of the first embodiment, the wireless communication system of the second embodiment has a distinctive feature that the system is formed based on TDD.

In a case that the base station apparatus 400 performs the multiuser MIMO transmission together with the terminal devices 200-1 to 200-U and 200-u', if the base station apparatus 400 has determined that the terminal device 200-u' cannot accurately send information through the multiuser MIMO transmission, the terminal device 200-u' is removed from the members which perform the multiuser MIMO transmission.

More specifically, as shown in FIG. 9,

After the terminal devices 200 that include the terminal device 200-u' transmitted sounding frames (see times t51, t52, and t53), the base station apparatus 400 transmits a data frame (see time t54).

After that, if ACK frames have been received from the terminal devices 200-1 to 200-U (see times t55 and t56) and no ACK frame has been received from the terminal device 200-u', then in the base station apparatus 400, the channel state information for the terminal device 200-u' is deleted by the transmission weight updating circuit 107 to update the transmission weight. Accordingly, data frame transmission is performed by means of the multiuser MIMQ transmission in which only the terminal devices 200-1 to 200-U participate (see time t57).

In the above explanation, a terminal device which could not perform accurate data is removed from the system by utilizing ACK frames. However, it is unnecessary to always employ the ACK frames.

For example, the above-described method can also be applied to a case in which no data to be transmitted to the terminal device 200-u' remains, or a case in which the terminal device 200-u' should be excluded from the system so as to satisfy a QoS (Quality of service) of the terminal devices. In these cases, no ACK frames are necessary.

In such cases, information that indicates each terminal to which data is being sent or is to be sent through the multiuser MIMO transmission (i.e., information about communication partners) may be included in a header of a sounding frame or a data frame.

A program for executing the function of the transmission weight updating circuit 107 pertaining to the present invention may be stored in a computer readable storage medium, and the program stored in the storage medium may be loaded and executed on a computer system, so as to perform the processes of the inverse matrix updating circuit 301 and the channel matrix multiplication circuit 302 to compute the transmission weight.

Here, the computer system has hardware resources which may include an OS and peripheral devices. The computer system also has a WWW system that provides a homepage service (or viewable) environment.

The above computer readable storage medium is a storage device, for example, a portable medium such as a flexible disk, a magneto optical disk, a ROM, or a CD-ROM, or a memory device such as a hard disk built in a computer system. The computer readable storage medium also includes a device for temporarily storing the program, such as a volatile memory (RAM) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such as (e.g., a telephone line).

In addition, the program may execute part of the above-explained functions. The program may also be a "differential" program so that the above-described functions can be executed by a combination program of the differential program and an existing program which has already been stored in the relevant computer system.

INDUSTRIAL APPLICABILITY

The present invention can be applied to a wireless communication system that employs a wireless LAN or cellular phones.

REFERENCE SYMBOLS 100, 400 base station apparatus
101 data generation circuit
102 transmission signal generation circuit
103-1, 103-2, 103-N wireless unit
104-1, 104-2, 104-N antenna element
105 channel state information reproduction circuit
106 transmission weight computation circuit
107 transmission weight updating circuit
200, 200-1, 200-u, 200-U, 500, 500-1, 500-u, 500-U terminal device
201-1-1, 201-1-2, 201-1-M(u), 201-U-1, 201-U-M(U) antenna element
202-1-1, 202-1-2, 202-1-M(1) wireless unit
203-1 reception signal demodulation circuit
204-1 transmission signal generation circuit
205-1 channel state information estimation circuit
206-1 channel state information compression circuit
301 inverse matrix updating circuit
302 channel matrix multiplication circuit
405 channel state information estimation circuit
506-1 data generation circuit

The invention claimed is:

1. A transmitter that has a plurality of antenna elements and executes spatially multiplexed transmission of data to a receiver via the antenna elements, where the data is weighted utilizing a transmission weight, the transmitter comprising:
   a channel state information collecting unit that obtains or estimates channel state information which indicates propagation characteristics between the antenna elements and an antenna element of the receiver; and
   a transmission weight updating unit, wherein when the channel state information has been updated, the transmission weight updating unit computes an updated transmission weight based on the previous channel state information before the updating thereof and the updated channel state information, and the previous transmission weight before the updating thereof, which was computed for the previous channel state information.

2. The transmitter in accordance with claim 1, wherein the transmission weight updating unit comprises:
   a channel matrix updating unit, wherein based on the previous channel state information and the updated channel state information, and a channel matrix which was utilized to compute the previous transmission weight, the channel matrix updating unit computes an updated channel matrix; and
   a transmission weight computation unit that computes the updated transmission weight based on the updated channel matrix, and the previous channel state information and the updated channel state information.

3. The transmitter in accordance with claim 2, wherein:
   for an inverse matrix of autocorrelation of the channel matrix utilized to compute the previous transmission weight, the channel matrix updating unit subtracts the previous channel state information from the inverse matrix and/or adds the updated channel state information to the inverse matrix to compute an updated inverse matrix, which the channel matrix updating unit utilizes to compute the updated channel matrix.

4. The transmitter in accordance with claim 3, wherein:
the channel matrix updating unit computes the previous inverse matrix of the autocorrelation of the channel matrix before the updating of the inverse matrix by:

[Formula 27]

$$R'(k)^{-1} = R(k)^{-1} + \frac{p_q(k)p_q(k)^H}{r_q(k)} \quad (27)$$

wherein:
[Formula 28]

$$P_q(k)=R(k)^{-1}(h_q(k)^H \quad (28)$$

[Formula 29]

$$r_q(k)=1-h_q(k)^T p_q(k) \quad (29)$$

and superscript H indicates the Hermitian transpose, and vector $h_q(k)$ denotes the kth frequency component of a channel state information vector for a downstream link to the receiver before the updating of the channel state information and is represented by:
[Formula 30]

$$h_q(k)=[H_{q,1}(k), H_{q,2}(k), \ldots, H_{q,N}(k)]^t \quad (30)$$

where $H_{q,n}(k)$ denotes the kth frequency component of an estimated value of the channel state information for the downstream link to the receiver from the nth antenna element of the plurality of the antenna elements; and
the channel matrix updating unit computes the updated inverse matrix by:

[Formula 31]

$$R''(k)^{-1} = R'(k)^{-1} - \frac{p'_q(k)p'_q(k)^H}{r'_q(k)} \quad (31)$$

wherein:
[Formula 32]

$$p'_q(k)=R'(k)^{-1}(h'_q(k)^T)^H \quad (32)$$

[Formula 33]

$$r'_q(k)=1+h'_q(k)^T P'_q(k) \quad (33)$$

and vector $h'_q(k)$ denotes the kth frequency component of the channel state information vector for the downstream link after the updating of the channel state information and is represented by:
[Formula 34]

$$h'_q(k)=[H'_{q,1}(k),H'_{q,2}(k),\ldots,H'_{q,N}(k)]^T \quad (34)$$

where $H'_{q,n}(k)$ denotes the kth frequency component of the estimated value of the updated channel state information for the downstream link.

5. The transmitter in accordance with claim 1, further comprising:
a transmission unit that transmits the receiver a signal which includes a data sequence utilized to estimate the propagation characteristics, wherein:
the channel state information collecting unit obtains the updated channel state information from a signal which is transmitted from the receiver only when the receiver updates the channel state information in response to the signal transmitted from the transmission unit.

6. The transmitter in accordance with claim 1, wherein:
the channel state information collecting unit estimates the updated channel state information based on a signal which is transmitted from the receiver when the receiver updates the channel state information, where the signal includes a data sequence utilized to estimate the propagation characteristics.

7. The transmitter in accordance with claim 1, further comprising:
an update propriety determination unit that determines whether or not a predetermined condition for the updating of the transmission weight is satisfied, wherein:
the transmission weight updating unit computes the updated transmission weight only when the predetermined condition is satisfied.

8. The transmitter in accordance with claim 7, wherein:
the update propriety determination unit determines that the predetermined condition is satisfied when cross correlation between the previous channel state information and the updated channel state information is computed and the computed value of the cross correlation is lower than a predetermined threshold.

9. The transmitter in accordance with claim 7, wherein:
the update propriety determination unit determines that the predetermined condition is satisfied when a coherence time capable of making communication with the receiver is set and time longer than the coherence time has elapsed, from a time when the channel state information collecting unit obtained or estimated the channel state information, with a variation less than or equal to a permissible value in the propagation characteristics.

10. A wireless communication method performed by a transmitter that has a plurality of antenna elements and executes spatially multiplexed transmission of data to a receiver via the antenna elements, where the data is weighted utilizing a transmission weight, the method comprising:
a channel state information collecting step that obtains or estimates channel state information which indicates propagation characteristics between the antenna elements and an antenna element of the receiver; and
a transmission weight updating step, wherein when the channel state information has been updated, the transmission weight updating step computes an updated transmission weight based on the previous channel state information before the updating thereof and the updated channel state information, and the previous transmission weight before the updating thereof, which was computed for the previous channel state information.

11. The wireless communication method in accordance with claim 10, wherein the transmission weight updating step includes:
a channel matrix updating step, wherein based on the previous channel state information and the updated channel state information, and a channel matrix which was utilized to compute the previous transmission weight, the channel matrix updating step computes an updated channel matrix; and
a transmission weight computation step that computes the updated transmission weight based on the updated channel matrix, and the previous channel state information and the updated channel state information.

\* \* \* \* \*